(12) United States Patent
Toyoda

(10) Patent No.: US 7,499,210 B2
(45) Date of Patent: Mar. 3, 2009

(54) ELECTROPHORETIC DISPLAY

(75) Inventor: Yoshito Toyoda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/553,718

(22) Filed: Oct. 27, 2006

(65) Prior Publication Data

US 2007/0047065 A1 Mar. 1, 2007

Related U.S. Application Data

(63) Continuation-in-part of application No. PCT/JP2005/009098, filed on May 18, 2005.

(30) Foreign Application Priority Data

May 31, 2004 (JP) ............................. 2004-162517

(51) Int. Cl.
*G02B 26/00* (2006.01)
(52) U.S. Cl. ...................................... 359/296; 359/297
(58) Field of Classification Search ................. 359/296, 359/297, 290, 238; 345/107
See application file for complete search history.

(56) References Cited

U.S. PATENT DOCUMENTS

| | | | |
|---|---|---|---|
| 3,756,693 A | | 9/1973 | Ota |
| 5,068,018 A | * | 11/1991 | Carlson ....................... 204/554 |
| 5,276,438 A | | 1/1994 | DiSanto et al. |
| 6,337,761 B1 | * | 1/2002 | Rogers et al. ............... 359/296 |
| 7,017,207 B2 | * | 3/2006 | Lauderman ..................... 5/495 |
| 7,259,744 B2 | * | 8/2007 | Arango et al. ............... 345/107 |

| | | |
|---|---|---|
| 2003/0132925 A1 | 7/2003 | Lin et al. |
| 2004/0226820 A1 * | 11/2004 | Webber et al. ............. 204/471 |

FOREIGN PATENT DOCUMENTS

| | | |
|---|---|---|
| CN | 1279549 A | 1/2001 |
| JP | S59034518 A | 2/1984 |
| JP | S59171930 A | 9/1984 |
| JP | H05061075 A | 3/1993 |
| JP | H06052358 A | 2/1994 |
| JP | 2002196376 A | 7/2002 |
| JP | 2002244163 A | 8/2002 |
| JP | 2003149690 A | 5/2003 |

OTHER PUBLICATIONS

International Bureau, English Translation of International Preliminary Report of Patentability for Related Application No. PCT/JP2005/000908, mailed Dec. 14, 2006.
Chinese Office Action issued in corresponding Chinese Application No. 200580017497.7 dated Jul. 8, 2008.
Office Action corresponding to application No. 20058001749.7 issued Jan. 11, 2008.

* cited by examiner

*Primary Examiner*—Timothy J Thompson
(74) *Attorney, Agent, or Firm*—Baker Botts LLP

(57) ABSTRACT

An electrophoretic display includes a first substrate, a second substrate, a mesh-like body, and charged particles At least a surface of the mesh-like body is formed of an insulating material, and the mesh-like body is interposed between the first substrate and the second substrate. The charged particles are dispersed in a space formed by a surface of the first substrate opposing the second substrate, a surface of the second substrate opposing the first substrate, and a surface of the mesh-like body. The charged particles can form desired images by moving within the space in response to an electric field generated between the first substrate and the second substrate.

18 Claims, 16 Drawing Sheets

B—B'

ELECTROPHORETIC DISPLAY

CROSS REFERENCE TO RELATED APPLICATIONS

This application is a continuation-in-part of PCT/JP2005/009098 of an international application designating the United States of America filed on May 18, 2005 (international filing date), and further claims priority based on 35 U.S.C section 119 to Japanese Patent Application No. 2004-162517 filed May 31, 2004. The entire content of each of these priority applications is incorporated herein by reference.

TECHNICAL FIELD

The disclosure relates to an electrophoretic display for displaying images using electrophoresis.

BACKGROUND

Electrophoretic displays that use electrophoresis to display images are well known in the art. This type of electrophoretic display has a display section that includes a transparent top substrate, and a bottom substrate disposed in opposition to the top substrate. A spacer provided around the periphery of the substrates provides a prescribed gap between the substrates and forms a hermetically sealed space therebetween. The hermetically sealed space is filled with a liquid dispersion medium containing charged pigment particles. By generating an electric field in the display section with the two substrates, the display moves charged particles in the liquid dispersion medium to the top electrode side in order to display the color of the charged particles on the surface, or moves the charged particles to the bottom substrate side so as to not display the color of the charged particles. In this way, the electrophoretic display can produce desired images.

One such electrophoretic display disclosed in Japanese unexamined patent application publication No. SHO-59-34518 is provided with dividing members (partitions) for partitioning the display section into a lattice of small cells. In this way, the electrophoretic display can maintain a uniform gap between the two substrates, even when the surface area of the display section is increased, and can prevent a great bias or aggregation of the charged particles.

Another electrophoretic display disclosed in Japanese unexamined patent application publication No. 2003-149690 provides a plurality of spherical bodies in the display section capable of concealing the charged particles when the charged particles are moved to the bottom substrate side so that the user cannot detect the charged particles. This electrophoretic display improves contrast in the displayed image (see Patent Reference 2, for example)

SUMMARY

However, in the electrophoretic display having dividing members (partitions) for forming small cells in a lattice shape, the area of contact between the top substrate and the dividing members (partitions) is increased in order to divide the display section into the plurality of small cells. Since it is not possible to change color tone in the contact areas because charged particles cannot move in these areas, an increased contact area reduces the area of the display section in which the displayed image can be changed. In other words, the contrast of the overall display screen is reduced.

Further, in order to display high-contrast images in the electrophoretic display using a plurality of spherical bodies, it is desirable to accommodate the spherical bodies in the display section in a closely packed structure so that these spherical bodies are fixed in close contact with each other. However, the process of accommodating numerous, micro-sized spherical bodies in the display section in a closely packed structure is complex, increasing the time and cost required to manufacture the device.

In view of the foregoing, it is an object of the invention to provide an electrophoretic display capable of displaying high-contrast images through a simple structure.

In order to attain the above and other objects, the invention provides an electrophoretic display including a first substrate; a second substrate disposed in opposition to the first substrate; a mesh-like body interposed between the first substrate and the second substrate, at least a surface of the mesh-like body being formed of an insulating material; and charged particles dispersed in a space formed by a surface of the first substrate opposing the second substrate, a surface of the second substrate opposing the first substrate, and the surface of the mesh-like body, the charged particles moving within the space in response to an electric field generated between the first substrate and the second substrate.

Further, the mesh-like body is preferably formed by assembling threadlike members extending in one direction with threadlike members extending in another direction intersecting one direction.

It is further desirable that the threadlike members extending in one direction are woven with the threadlike members extending in another direction each time the threadlike members extending in one direction intersect a prescribed number of the threadlike members extending in another direction.

It is further desirable that a unit including a plurality of threadlike members extending in one direction intersects the threadlike members extending in another direction.

It is further desirable that the unit of threadlike members passes between adjacent threadlike members extending in another direction.

It is further desirable that the threadlike member extending in one direction has a different diameter from the threadlike member extending in another direction.

It is further desirable that a plurality of threadlike members having different diameters and extending at least in one of one direction and another direction are repeatedly arranged in a prescribed order.

It is further desirable that the mesh-like body is formed uniformly by intertwining a plurality of the threadlike members.

It is further desirable to form the mesh-like body uniformly by weaving a plurality of the threadlike members.

It is further desirable to dispose the mesh-like body between the first substrate and the second substrate so that a plane of the mesh shape is parallel to the first substrate and the second substrate.

It is also desirable that the threadlike members be formed of an organic polymer compound.

It is further desirable that the mesh-like body is bonded to at least one of the surface of the first substrate opposing the second substrate and the surface of the second substrate opposing the first substrate.

It is further desirable that at least one of the first substrate and the second substrate is a translucent substrate disposed on a display surface side, and the mesh-like body is bonded to the substrate disposed on the display surface side.

It is further desirable that the first and second substrates and the mesh-like body have flexibility.

It is further desirable to provide first electrodes in the first substrate and second electrodes in the second substrate for applying an electric field between the first and second substrates.

It is further preferable that the first electrodes are line electrodes parallel to the first substrate, while the second electrodes are line electrodes that are oriented parallel to the second substrate and orthogonal to the first electrodes.

It is further desirable that one of the first electrodes and the second electrodes is a single electrode to which a fixed potential is applied, while the other electrodes are configured of a plurality of electrodes to which voltages are applied individually.

It is further desirable that the charged particles be configured of at least two types of charged particles having different color tones respectively.

It is further desirable that the plurality of charged particles be configured of at least two types of charged particles having differing color tones respectively, and that the color tone of the threadlike members be identical to the color tone of one type of the charged particles.

It is further desirable that the mesh-like body is a spacer for maintaining a fixed distance between the first substrate and the second substrate.

BRIEF DESCRIPTION OF THE DRAWINGS

Illustrative aspects in accordance with the invention will be described in detail with reference to the following figures wherein.

DETAILED DESCRIPTION

An image-displaying device 1 serving as a first embodiment of the electrophoretic display according to the present invention will be described while referring to the accompanying drawings. The image-displaying device 1 serving as the preferred embodiment is a small display panel that can be mounted in a portable electronic device. The overall structure of the image-displaying device 1 according to the preferred embodiment will be described with reference to FIGS. 1 through 5.

Figure 1:
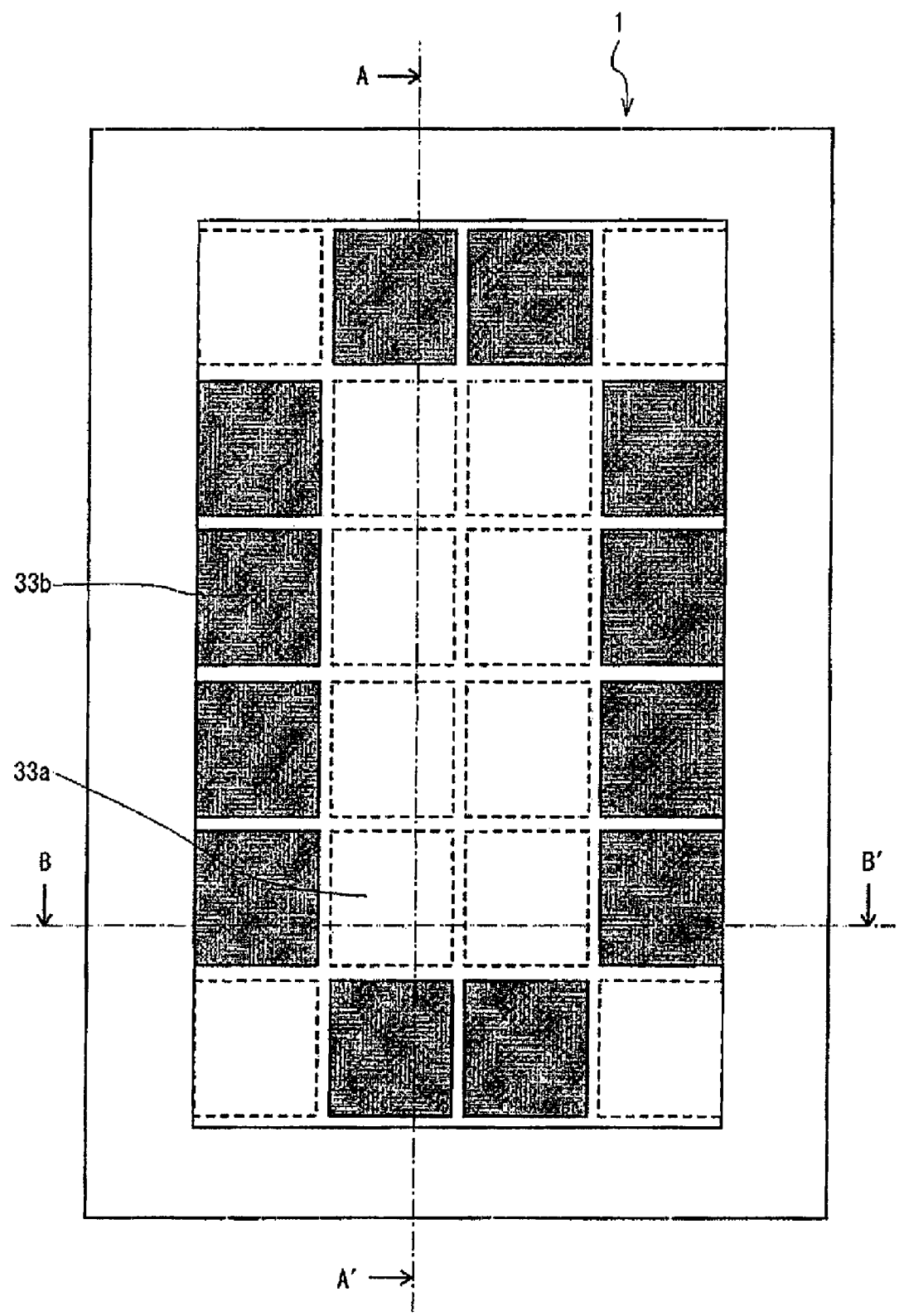
FIG. 1 is a front view of an image-displaying device 1 according to illustrative aspects of the invention.
Figure 2:
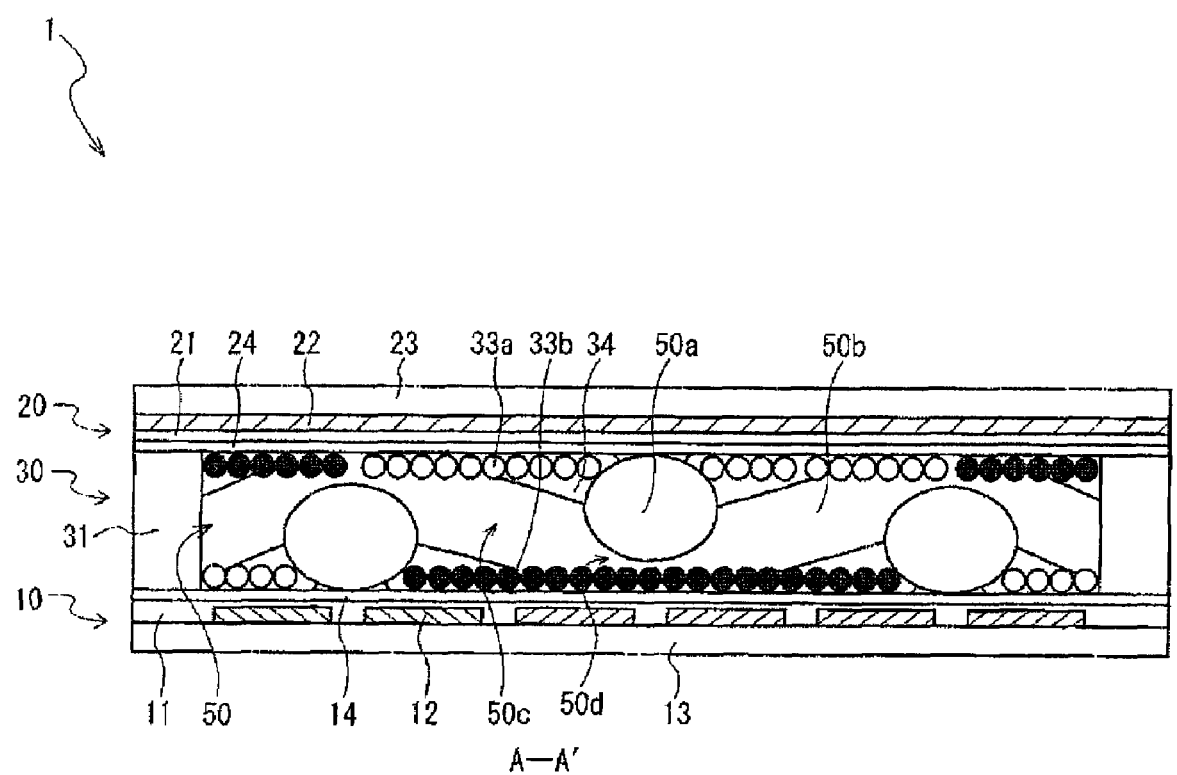
FIG. 2 is a cross-sectional view of the image-displaying device 1 along a line A-A' (FIG. 1) and in the direction of the arrow according to illustrative aspects of the invention.
Figure 3:
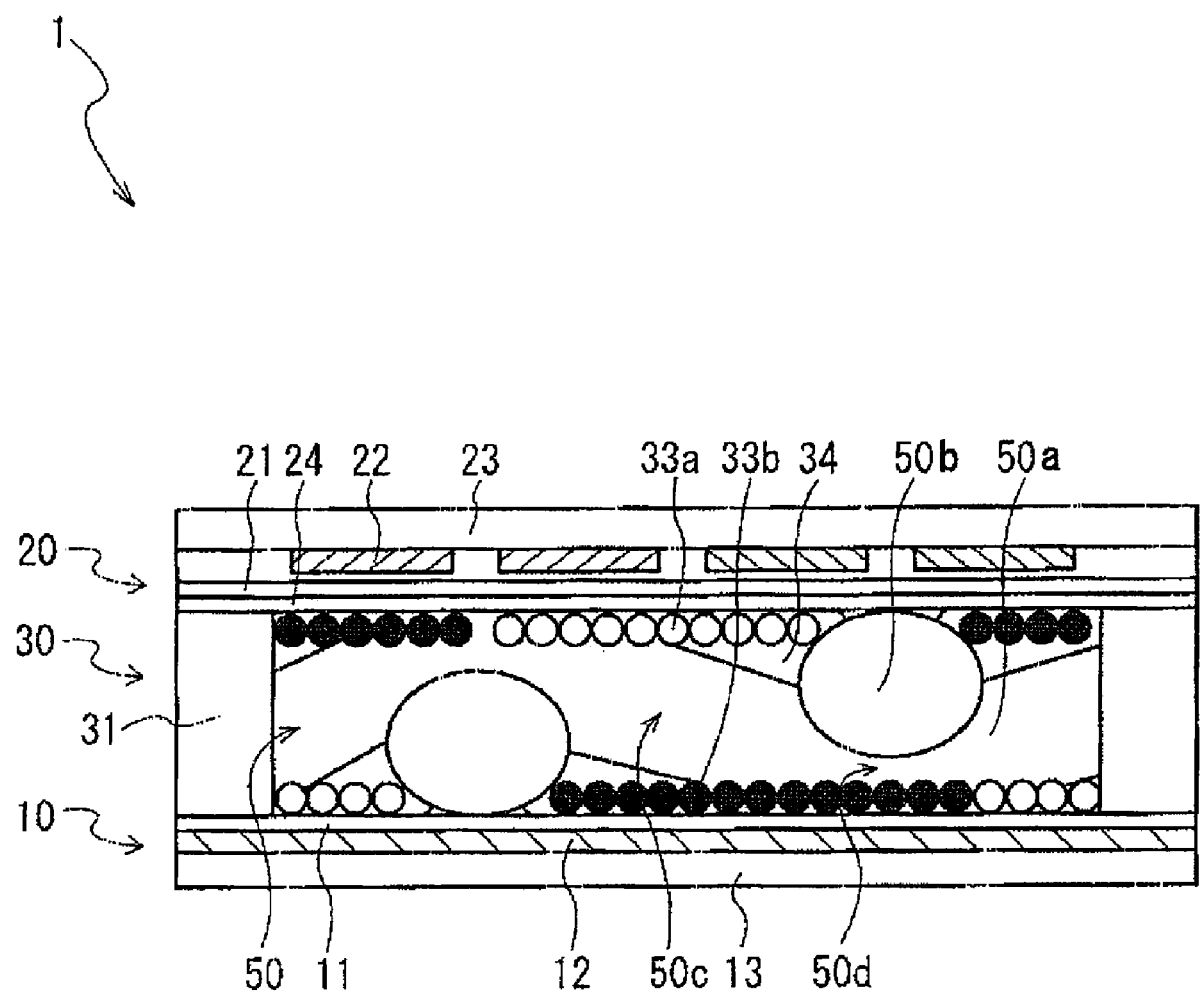
FIG. 3 is a cross-sectional view of the image-displaying device 1 along a line B-B' (FIG. 1) in the direction of the arrow according to illustrative aspects of the invention.

First, an overview of the image-displaying device will be given. FIG. 1 is a front view of an image-displaying device 1. FIG. 2 is a cross-sectional view of the image-displaying device 1 along a line A-A' (FIG. 1) and in the direction of the arrow. FIG. 3 is a cross-sectional view of the image-displaying device 1 along a line B-B' (FIG. 1) in the direction of the arrow. The image-displaying device 1 includes a bottom substrate 10, and a top substrate 20 disposed in opposition to the bottom substrate 10. The image-displaying device 1 has an elongated rectangular parallelepiped shape in a plan view, forming a display section 30 between the bottom substrate 10 and the top substrate 20.

The bottom substrate 10 includes a support member 13 for supporting the image-displaying device 1, a bottom substrate layer 11 provided on the top surface of the support member 13 (above the support member 13 in FIGS. 2 and 3), and a plurality of bottom electrodes 12 provided on the bottom substrate layer 11. The bottom substrate layer 11 is configured of a resinous film such as polyethylene terephthalate, and inorganic materials such as glass, or other good insulating material. In the preferred embodiment, the bottom substrate layer 11 and the support member 13 are plastic substrates (resin films) formed of the flexible polyethylene terephthalate. The bottom electrodes 12 are conducting wires arranged parallel to the transverse direction of the image-displaying device 1 (left-to-right direction in FIG. 1). In the preferred embodiment, the image-displaying device 1 has six bottom electrodes 12.

The top substrate 20 is disposed above and parallel to the bottom substrate 10 and opposes the bottom substrate 10 with a prescribed gap formed therebetween. The top substrate 20 is configured of a display layer 23 functioning as a display surface, an insulating top substrate layer 21 provided on the bottom surface of the display layer 23, and a plurality of top electrodes 22 provided on the top substrate layer 21. The display layer 23 is configured of a highly transparent material, such as polyimide, polyethylene terephthalate, or glass. The top electrodes 22 are conducting wires disposed parallel to a longitudinal direction of the image-displaying device 1 (vertical direction in FIG. 1). In the preferred embodiment, the image-displaying device 1 has four top electrodes 22.

In the preferred embodiment, the top substrate layer 21 and the display layer 23 are plastic substrates (resin films) formed of polyethylene terephthalate The top electrodes 22 are transparent electrodes formed of indium tin oxide (ITO). Hence, since the entire top substrate 20 is configured of transparent materials, the user can view the display section 30 through the top substrate 20 from a position above the top substrate 20 (from the top of the image-displaying device 1 in FIG. 2).

A bottom adhesive layer 14 and a top adhesive layer 24 are provided on the top surface side of the bottom substrate layer 11 and the bottom surface side of the top substrate layer 21, respectively, for fixing a mesh-like body 50 described later. The bottom adhesive layer 14 and the top adhesive layer 24 for fixing the mesh-like body 50 are configured of transparent adhesive. The transparent adhesive used in the bottom adhesive layer 14 and the top adhesive layer 24 is formed of an acrylic resin, an epoxy resin, or the like.

The display section 30 is a space defined by the bottom substrate 10, the top substrate 20, and a sealing layer 31. The sealing layer 31 is formed of an acrylic resin or an epoxy resin adhesive and is provided around the periphery of the display section 30 for joining the bottom substrate 10 to the top substrate 20. As a result, the sealing layer 31 not only defines and fixes the periphery of the display section 30, but also supports the bottom substrate 10 and the top substrate 20.

Figure 4:
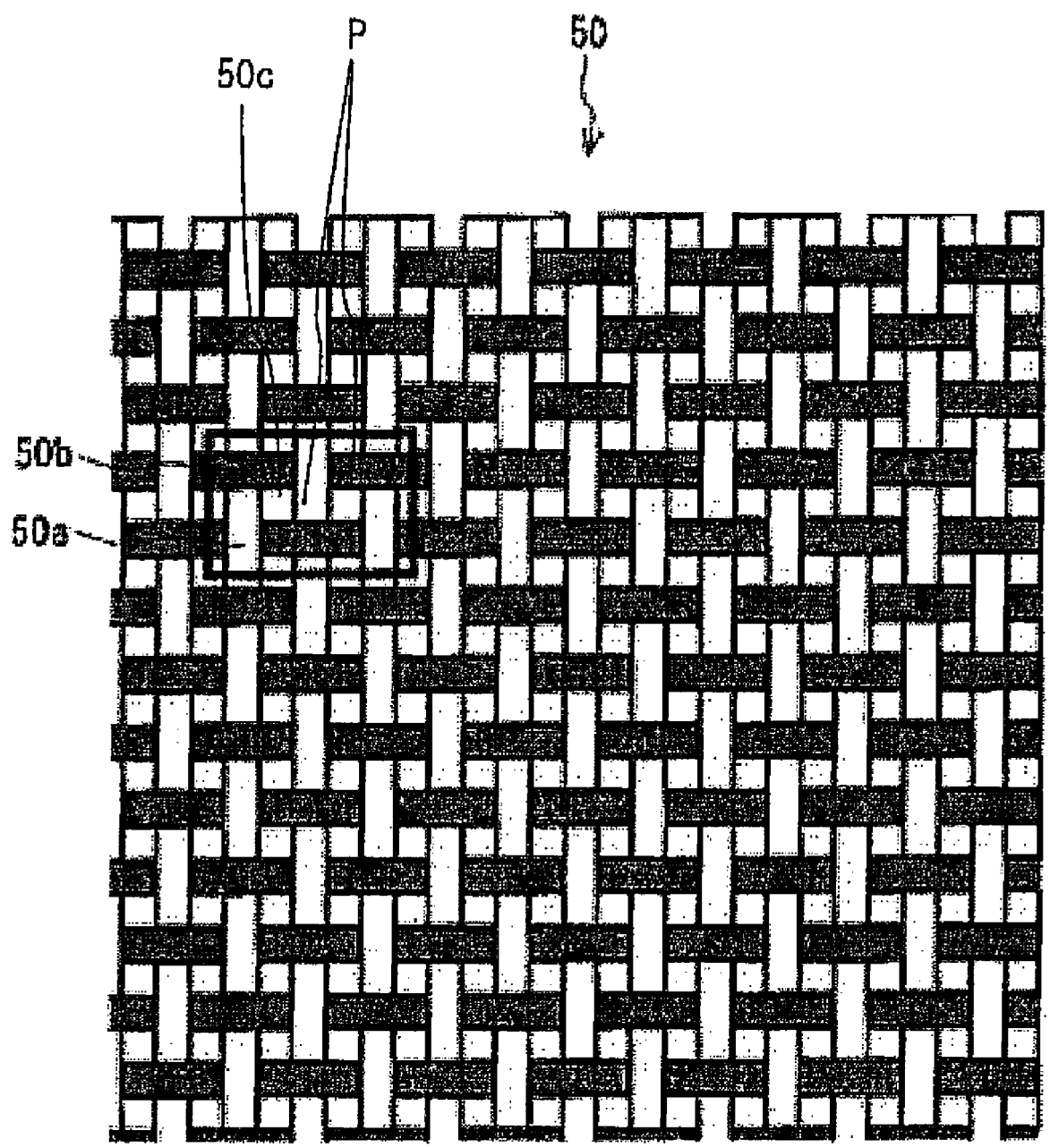
FIG. 4 is a front view of a mesh-like body 50 according to illustrative aspects of the invention.

Next, the internal structure of the display section 30 will be described. The display section 30 accommodates the mesh-like body 50 forming a single thin mesh. FIG. 4 is a front view of the mesh-like body 50. As shown in FIG. 4, the mesh-like body 50 includes threadlike members 50a and threadlike members 50b, one of which are lengthwise threads and the other of which are crosswise threads. The lengthwise threads and crosswise threads are interlaced alternately at fixed intervals, configuring a "plain weave" composition. At points of intersection, the lengthwise threads and the crosswise threads are intertwined and fixed to each other so that intersecting points with the lengthwise thread on top and the crosswise thread on bottom alternate with intersecting points with the crosswise thread on top and the lengthwise thread on bottom. In FIG. 4, color has been added to the threadlike members 50b in order to distinguish them from the threadlike members 50a. For simplicity, the mesh-like body 50 is depicted as a uniform combination of three threadlike members 50a and two threadlike members 50b in FIGS. 2 and 3 (corresponding to the framed section in FIG. 4).

The threadlike members 50a and 50b include a plurality of micro-thread members having a substantially circular cross-section and formed of a material having good flexibility and insulating properties. More specifically, the threadlike members may be formed of a synthetic fiber from nylon, polyester, acrylate, polypropylene, fluorine, or the like; a natural fiber, such as silk or cotton; or various organic polymer compounds.

The threadlike members 50a and 50b are identical in the preferred embodiment, having the same material, shape, and color. The threadlike members are approximately 100 μm in diameter and are white in color. The plurality of threadlike members 50a (or the plurality of threadlike members 50b) are juxtaposed at intervals of approximately 150 μm.

By uniformly assembling the mesh-like body 50 in a lattice arrangement with the plurality of intersecting threadlike members 50a and 50b, a member having a mesh structure is configured with a plurality of fine gaps (openings). Since a mesh structure is more flexible and since the threadlike members 50a and 50b are configured of flexible members, the mesh-like body 50 is highly flexible. The mesh-like body 50 has a thickness substantially equivalent to the gap between the bottom substrate 10 and the top substrate 20 (the height of the display section 30) and has longitudinal and latitudinal dimensions substantially equivalent to those of the display section 30 in a plan view. In other words, the mesh-like body 50 is substantially equivalent in size to the display section 30 and is accommodated inside the display section 30 parallel to the bottom substrate 10 and the top substrate 20.

FIG. 2 shows a cross-section of three threadlike members 50a in the display section 30 taken along the line A-A' (see FIG. 1) parallel to the longitudinal direction of the image-displaying device 1 (the vertical direction in FIG. 1). FIG. 2 also shows the threadlike members 50b extending between both ends of the display section 30 along the line A-A'. The threadlike members 50b bend up and down within the display section 30, while intersecting (intertwining) with the three threadlike members 50a. The top electrodes 22 span between both longitudinal ends of the image-displaying device 1 in the top substrate layer 21, while the cross-section of the bottom electrodes 12 can be seen in the bottom substrate layer 11.

FIG. 3 shows a cross-section taken along the line B-B' parallel to the latitudinal direction of the image-displaying device 1 (left-to-right direction in FIG. 1). The threadlike members 50a extend within the display section 30 between both ends of the display section 30 along the line B-B' and slope up and down within the display section 30 while intersecting (intertwining) with two threadlike members 50b. A cross-section of the top electrodes 22 can be seen in the top substrate layer 21, while the bottom electrodes 12 extend between both latitudinal ends of the image-displaying device 1 within the bottom substrate layer 11. In other words, the plurality of bottom electrodes 12 and the plurality of top electrodes 22 are provided on the bottom substrate layer 11 and the top substrate layer 12, respectively, so as to have a skew relationship.

As shown in FIGS. 2 and 3, the mesh-like body 50 is fixed with the bottom surface (threads positioned on the bottom) in contact with the bottom adhesive layer 14 of the bottom substrate 10, and the top surface (threads positioned on the top) in contact with the top adhesive layer 24 of the top substrate 20. Since the mesh-like body 50 settles slightly into the bottom adhesive layer 14 and top adhesive layer 24 when fixing the mesh-like body 50 with adhesive, the top adhesive layer 24 of the top substrate 20 and the bottom adhesive layer 14 of the bottom substrate 10 deforms slightly. Specifically, adhesive equivalent to the amount that the mesh-like body 50 settles into the bottom adhesive layer 14 and the top adhesive layer 24 is displaced around the periphery of the mesh-like body 50 (not shown). Accordingly, sharp angles are not formed at the points of contact between the bottom adhesive layer 14 and top adhesive layer 24 and the threadlike members 50a and 50b, making it less likely that charged particles 33a and 33b will enter and become trapped in these contact areas.

With this construction, the mesh-like body 50 partitions the inside of the display section 30 into a plurality of small spaces, forming small cells 50c (FIG. 4). More specifically, a single space (opening) formed between the threadlike members 50a and 50b and bordered by the top surface of the bottom substrate 10 (the surface opposing the top substrate 20) and the bottom surface of the top substrate 20 (the surface opposing the bottom substrate 10) constitutes a single small cell 50c.

Further, the mesh-like body 50, together with the sealing layer 31, functions as a spacer for maintaining a fixed gap in the display section 30 between the bottom substrate 10 and the top substrate 20. More specifically, the mesh-like body 50 is fixed inside the display section 30 so as to contact the bottom substrate 10 and the top substrate 20 at intersecting points P (FIG. 4) between the threadlike members 50*a* and 50*b*.

However, each of the four sides of the small cells 50*c* in a plan view is defined by only one of the threadlike members 50*a* and 50*b* in regions where the threadlike members 50*a* and the threadlike members 50*b* are. Accordingly, gaps (hereinafter, referred to as continuous openings 50*d*) are formed on the four sides of the small cells 50*c* (FIGS. 2 and 3) corresponding to the difference between the gap between the bottom substrate 10 and the top substrate 20 and the diameter of the threadlike member 50*a* or the threadlike member 50*b*. Hence, the charged particles 33 and a liquid dispersion medium 34 described later can move between the small cells 50*c* via the continuous openings 50*d*. In this way, the interior of the display section 30 is configured of small cells 50*c* that are interconnected via the continuous openings 50*d*.

Further, the display section 30 is filled with the charged particles 33*a* and 33*b* and the liquid dispersion medium 34. The charged particles 33*a* and 33*b* are configured of a material that can be charged within the liquid dispersion medium 34, such as a pigment or dye formed of an organic or inorganic compound, or a pigment or dye encapsulated in a synthetic resin. The charged particles 33*a* are white particles configured of titanium dioxide encapsulated in a polyethylene resin, and the charged particles 33*b* are black particles configured of carbon black encapsulated in a polyethylene resin. Therefore, the charged particles 33*a* have a white color tone, while the charged particles 33*b* have a black color tone. As will be described later, images are displayed in the preferred embodiment by moving the two types of charged particles 33*a* and 33*b* having different color tones through application of an electric field. Hence, the charged particles 33*a* and 33*b* are charged so as to be different in positive and negative polarity. The liquid dispersion medium 34, on the other hand, has a high insulating property and low viscosity. For example, the liquid dispersion medium 34 may be a type of alcohol, a hydrocarbon, or silicon oil. In the preferred embodiment, the liquid dispersion medium 34 is a colorless liquid.

Since the display layer 23 of the top substrate 20 is a transparent member, the user can view a display section 30 from above the image-displaying device 1, as shown in FIG. 1. As will be described later, the image-displaying device 1 of the preferred embodiment displays images in a total of 24 dots, including six dots vertically and four dots horizontally. The numeral "0" is displayed in the example of FIG. 1.

Next, an operation to display an image with the image-displaying device 1 of the preferred embodiment will be described. As shown in FIGS. 2 and 3, the image-displaying device 1 having the structure described above uses a simple matrix drive system to perform a display operation. According to the simple matrix drive system, the image-displaying device 1 produces prescribed electric fields only at intersecting points between conducting wires of the bottom electrodes 12 and top electrodes 22 disposed in opposition to each other by transmitting electric signals along the conducting wires at a prescribed timing. When a prescribed electric field is produced at these intersecting points, the positively or negatively charged particles 33*a* and 33*b* interposed between the bottom electrodes 12 and top electrodes 22 at the intersecting points within the small cells 50*c* formed in the mesh-like body 50 migrate toward the electrode to which the opposite polarity is applied.

For example, if the charged particles 33*a* are positively charged and the charged particles 33*b* are negatively charged, and if the bottom electrodes 12 are cathodes and the top electrodes 22 are anodes, the charged particles 33*a* migrate toward the bottom electrodes 12, while the charged particles 33*b* migrate toward the top electrodes 22. On the other hand, if the bottom electrodes 12 are anodes and the top electrodes 22 are cathodes, the charged particles 33*a* migrate toward the top electrodes 22, while the charged particles 33*b* migrate toward the bottom electrodes 12. Similarly, if the charged particles 33*a* are negatively charged and the charged particles 33*b* are positively charged, the charged particles 33*a* migrate toward the substrate having the positive polarity, while the charged particles 33*b* migrate toward the substrate having the negative polarity.

When migrating toward the top electrodes 22, the charged particles 33*b* adhere to the bottom surface of the top substrate layer 21 (the surface opposing the bottom substrate 10) so that the black color of the charged particles 33*b* can be seen from above (from the top side in FIG. 2) via the transparent top substrate 20, as shown in FIG. 1. At the same time, the charged particles 33*a* migrate toward the bottom electrodes 12. Therefore, the charged particles 33*a* are shielded behind the charged particles 33*b* deposited on the top substrate layer 21 so that the user cannot see the white color of the charged particles 33*a*. When the charged particles 33*a* migrate toward the top electrodes 22, the charged particles 33*a* adhere to the bottom surface of the top substrate layer 21 (the surface opposing the bottom substrate 10) so that the white color of the charged particles 33*a* can be seen from above (from the top in FIG. 2) via the transparent top substrate 20. At the same time, the charged particles 33*b* migrate toward the bottom electrodes 12. Therefore, the charged particles 33*b* are shielded behind the charged particles 33*a* deposited on the top substrate layer 21 in a plan view so that the user cannot see the black color of the charged particles 33*b*. The charged particles 33*a* and 33*b* that migrate toward the bottom electrodes 12 become deposited on the top surface of the bottom substrate layer 11 (the surface opposing the top substrate 20).

In the image-displaying device 1 of the preferred embodiment, the bottom electrodes 12 include six conducting wires and the top electrodes 22 four conducting wires arranged so as to have a skew relationship (see FIGS. 2 and 3). In a plan view, the conducting wires intersect at a total of 24 positions (see FIG. 1). A set of opposing electrodes is provided at each intersecting position of the conducting wires for controlling the electric field generated in the display section 30, thereby controlling whether white or black is displayed at each dot. In other words, this structure controls an area with six dots longitudinally and four dots horizontally, for a total of 24 dots, making it possible to display images, such as the number "0" shown in FIG. 1.

Next, we will consider cases in which the image-displaying device 1 of the preferred embodiment is shaken or tilted. Once the image-displaying device 1 performs an image displaying operation to display a desired image, an image force holds the charged particles 33*a* and 33*b* on the top substrate layer 21 or the bottom substrate layer 11, even when a voltage is no longer applied, thereby preserving the displayed image. More specifically, the charged particles 33*a* and 33*b* are held on the top substrate layer 21 or the bottom substrate layer 11 by static electricity generated on the charged particles 33*a* and 33*b*, the top substrate layer 21, and the bottom substrate layer 11. Hence, the displayed image does not break apart when the image-displaying device 1 is shaken or tilted to a degree. However, the charged particles 33*a* and 33*b* will shift if subjected to a vibrational energy or the like greater than the image force.

Figure 5:
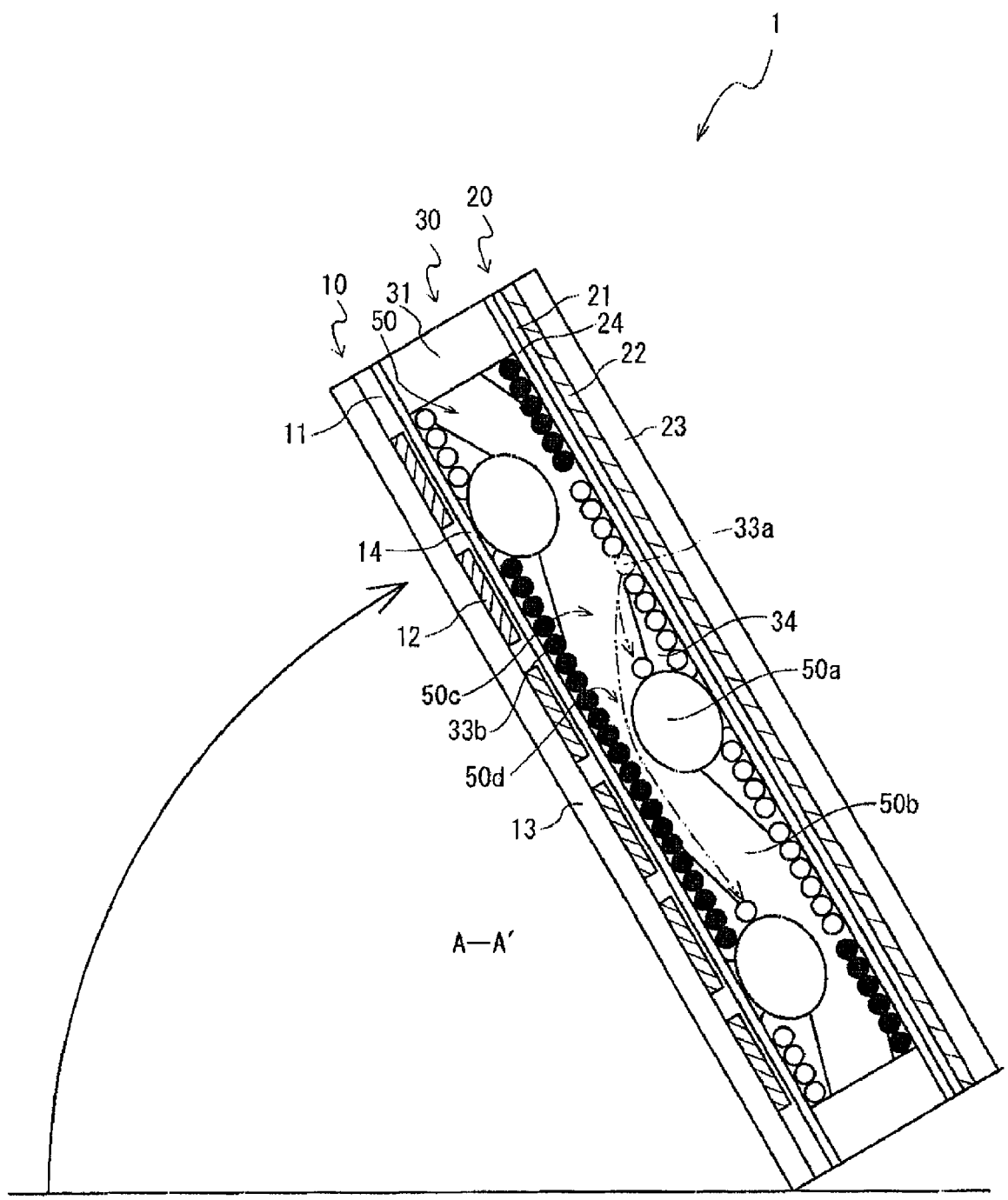
FIG. 5 is a cross-sectional view along a line A-A' (FIG. 1) in the direction of the arrow, showing the image-displaying device 1 that is tilted toward the A' direction according to illustrative aspects of the invention.

FIG. 5 is a cross-sectional view along a line A-A' (FIG. 1) in the direction of the arrow, showing the image-displaying device 1 that is tilted toward the A' direction. As shown in FIG.

5, if the image-displaying device 1 is tilted far in the A' direction (toward the right in FIG. 5) to an extent that the charged particles 33a detach from the top substrate layer 21, the charged particles 33a will fall downward into the display section 30 due to the force of gravity. However, in the image-displaying device 1 according to the preferred embodiment, charged particles 33a falling from the top substrate layer 21 are retained on (get caught on) the threadlike member 50a performing the small cell 50c and do not migrate out of the small cell 50c. Even if a falling charged particle 33a is not retained on (does not get caught on) the threadlike member 50a or the charged particles 33b and migrate into an adjacent small cell 50c through the continuous opening 50d, the falling charged particle 33a will be retained on (will get caught on) the threadlike member 50a forming the neighboring small cell 50c and will not continue to migrate out of this neighboring small cell 50c.

Hence, even when the charged particles 33a and 33b become detached in the image-displaying device 1 of the preferred embodiment, these charged particles are retained on (are caught up on) the threadlike members 50a and 50b in the original small cell 50c or an adjacent small cell 50c. Alternately interlacing the threadlike members 50a and 50b to configure the mesh-like body 50 provided in the display section 30 has the effect of forming adjacent small cells 50c having continuous openings 50d of different heights (distance from the bottom substrate 10 or the top substrate 20; see FIGS. 2 and 3). Accordingly, the charged particles 33a and 33b moving in the display section 30 can only move within the original small cell 50c or the neighboring small cell 50c (see FIG. 5).

Next, a method of manufacturing the image-displaying device 1 will be described. First, the mesh-like body 50 is placed on top of the bottom substrate 10 and is fixed to the bottom adhesive layer 14. Next, the plurality of small cells 50c formed in the mesh structure is filled from above the mesh-like body 50 (from the top in FIGS. 2 and 3) with the liquid dispersion medium 34 containing the plurality of charged particles 33a and 33b. Subsequently, the top substrate 20 is placed over the top surface of the mesh-like body 50, while the mesh-like body 50 is fixed to the top adhesive layer 24. Finally, the sealing layer 31 is formed along the edges of the mesh-like body 50 and around the entire periphery of the mesh-like body 50 for completely sealing the periphery of the display section 30.

While the plurality of continuous openings 50d are formed inside the display section 30, the surface tension of the liquid dispersion medium 34 prevents the medium from flowing out of the continuous openings 50d at the edges of the mesh-like body 50. Therefore, the periphery of the mesh-like body 50 need not be sealed by the sealing layer 31 before or when the mesh-like body 50 is filled with the liquid dispersion medium 34. Hence, this method facilitates filling the small cells 50c of the mesh-like body 50 with the liquid dispersion medium 34 and sealing the periphery of the display section 30 with the sealing layer 31.

With this simple manufacturing method, it is possible to form the display section 30 as a hermetically sealed space inside the case and to fix the mesh-like body 50 inside the display section 30. It is also possible to manufacture the image-displaying device 1 to be uniformly filled with the charged particles 33a and 33b and the liquid dispersion medium 34.

According to the image-displaying device 1 of the first embodiment described above, the mesh-like body 50 formed by assembling a plurality of the threadlike members 50a and 50b is mounted inside the display section 30 parallel to the bottom substrate 10 and the top substrate 20. The mesh-like body 50 is constructed by uniformly forming the plurality of threadlike members 50a and 50b in a "plain weave" composition. The mesh structure of the mesh-like body 50 can uniformly divide the interior of the display section 30 into the plurality of small cells 50c, thereby preventing a large bias in charged particles 33a and 33b and improving image uniformity.

Since the threadlike members 50a and 50b forming the mesh-like body 50 have a substantially circular cross-section, there is less area of contact between the bottom substrate 10 and the top substrate 20, thereby improving the aperture ratio signifying the percentage of the display section 30 that is used for displaying an image and improving the contrast of the image.

Further, the image-displaying device 1 has a simple structure in which the mesh-like body 50 is provided in the display section 30, and the mesh-like body 50 is a simple member configured of the threadlike members 50a and 50b. Further, the plurality of small cells 50c formed by the mesh-like body 50 in the display section 30 are interconnected via the continuous openings 50d. Further, the mesh-like body 50 not only divides the interior of the display section 30 into the plurality of small cells 50c, but also functions as a spacer for maintaining a fixed gap between the bottom substrate 10 and the top substrate 20. Hence, the image-displaying device 1 according to the present invention can be manufactured easily and at a lower cost.

Further, by using an organic polymer compound to form the threadlike members 50a and 50b, it is possible to manufacture easily and cheaply a mesh-like body 50 having excellent resistance to pressure. Further, since the bottom substrate 10 and the top substrate 20 are configured of flexible members, and since the mesh like structure of the mesh-like body 50 has excellent flexibility and resistance to pressure, the overall image-displaying device 1 is physically flexible, providing the user with an easy to carry case.

Further, by fixing the mesh-like body 50 to the bottom adhesive layer 14 and the top adhesive layer 24 in the display section 30, the mesh-like body 50 can be reliably fixed inside the display section 30. At the same time, this structure prevents charged particles 33a and 33b from becoming trapped between the mesh-like body 50 and the bottom substrate 10 or the top substrate 20.

Further, in addition to giving the charged particles 33a and the charged particles 33b the different color tones of white and black, respectively, the threadlike members 50a and 50b are also made white to match the charged particles 33a. Accordingly, images are displayed by combining the white color of the charged particles 33a and the threadlike members 50a and 50b with the black color of the charged particles 33b, thereby further improving the image contrast through different color tones.

Figure 6:
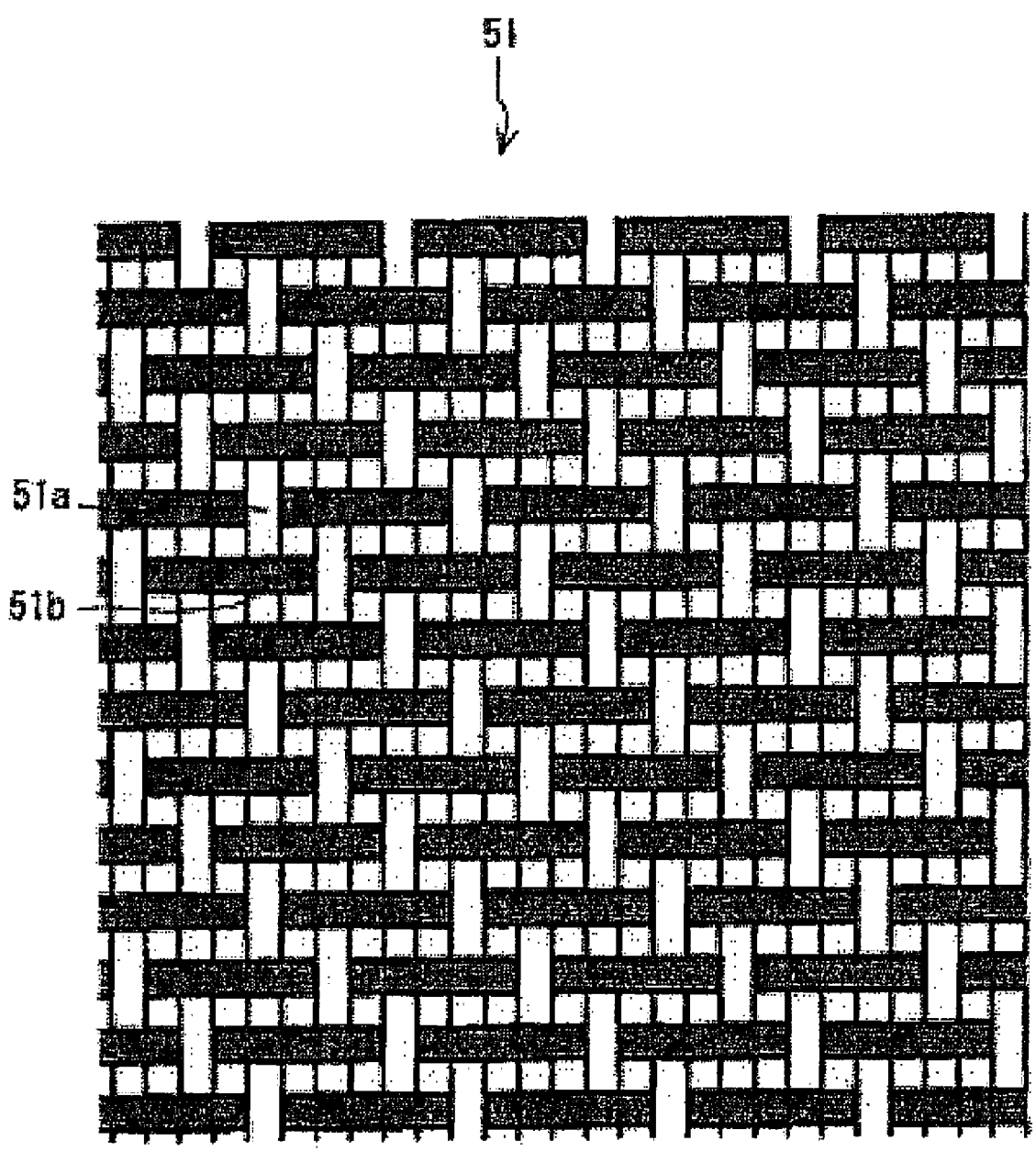
FIG. 6 is a front view of a mesh-like body 51 according to illustrative aspects of the invention.

Next, a second embodiment of the present invention will be described while referring to the accompanying drawings. FIG. 6 is a front view of a mesh-like body 51. As with the mesh-like body 50 according to the first embodiment, the mesh-like body 51 of the second embodiment is a member having a mesh structure configured by crossing a plurality of threadlike members 51a extending parallel to the lateral direction of the image-displaying device 1 (the left-to-right direction in FIG. 1) with a plurality of threadlike members 51b extending parallel to the longitudinal direction of the image-displaying device 1 (vertical direction in FIG. 1) to form a lattice shape. However, the mesh-like body 51 differs in the method of assembly. Here, the threadlike members 51a and 51b are identical to the threadlike members 50a and 50b in the first embodiment.

As shown in FIG. 6, the mesh-like body 51 of the preferred embodiment combines the threadlike members 51a and the threadlike members 51b, one of which are lengthwise threads and the other of which are crosswise threads, in equal units of three or more to produce a "twill weave" composition that gives the appearance of diagonal ribs called twill lines on the surface of the fabric. More specifically, the mesh-like body 51 is produced by a three-harness twill, which is the most basic "twill weave" composition comprising units of three lengthwise threads and crosswise threads each.

As in the first embodiment, the mesh-like body 51 is mounted inside the display section 30, evenly dividing the interior of the display section 30 into a plurality of small cells. In other words, the mesh-like body is not limited to the "plain weave" composition of the first embodiment, but may have a "twill weave" composition or the like, as in the example of the second embodiment.

In the image-displaying device 1 according to the second embodiment described above, the mesh-like body 51 formed with a "twill weave" composition can prevent a large bias in the charged particles 33a and 33b and can improve flexibility in a specific direction owing to the texture of the weave. Further, thicker threadlike members may be used in the second embodiment than in the "plain weave" composition, enabling the production of a stiffer mesh-like body and improving the strength of the image-displaying device 1.

Figure 7:
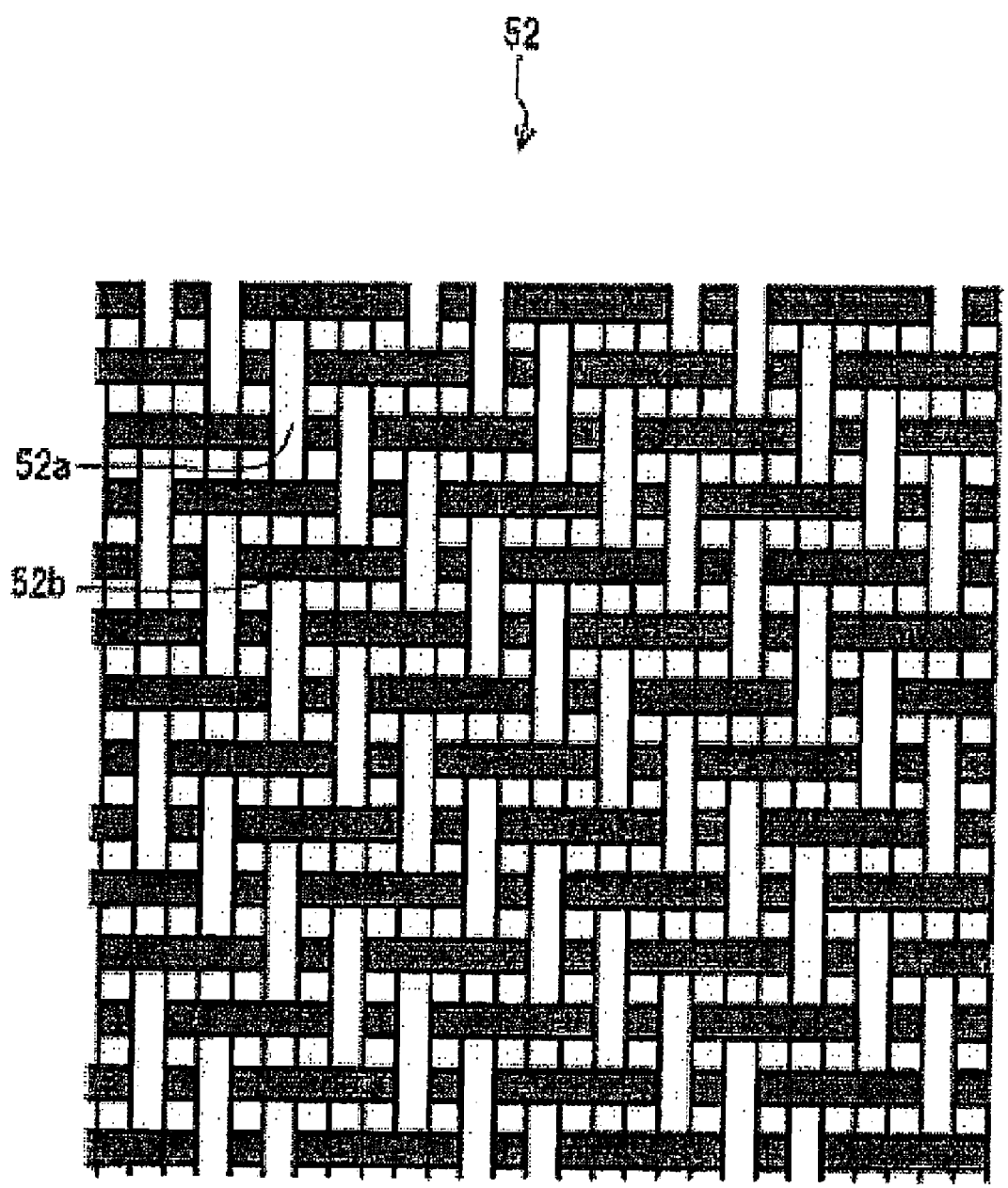
FIG. 7 is a front view of a mesh-like body 52 according to illustrative aspects of the invention.

Next, a third embodiment of the present invention will be described while referring to the accompanying drawings. FIG. 7 is a front view of a mesh-like body 52. As with the mesh-like body 51 according to the second embodiment, the mesh-like body 52 of the third embodiment is a member having a mesh structure configured by crossing a plurality of threadlike members 52a extending parallel to the lateral direction of the image-displaying device 1 (the left-to-right direction in FIG. 1) with a plurality of threadlike members 52b extending parallel to the longitudinal direction of the image-displaying device 1 (vertical direction in FIG. 1) to form a lattice shape. However, the mesh-like body 52 differs in the method of assembly. Here, the threadlike members 52a and 52b are identical to the threadlike members 51a and 51b in the second embodiment.

As shown in FIG. 7, the mesh-like body 52 of the preferred embodiment combines the threadlike members 52a and the threadlike members 52b, one of which are lengthwise threads and the other of which are crosswise threads, to form a "twill weave" composition similar to the mesh-like body 51 in the second embodiment. More specifically, the mesh-like body 52 is produced by a four-harness twill, which is a "twill weave" composition comprising units of four lengthwise threads and crosswise threads each.

As in the second embodiment, when mounted inside the display section 30, the mesh-like body 52 evenly divides the interior of the display section 30 into a plurality of small cells. In other words, the mesh-like body is not limited to the "twill weave" composition described in the second embodiment, in which the mesh-like body 51 is formed with a three-harness twill having units of three lengthwise and crosswise threads each, but may employ any of various "twill weave" compositions, such as the four-harness twill forming the mesh-like body 52 in the example of the third embodiment.

In the image-displaying device 1 according to the third embodiment described above, the mesh-like body 52 formed with a four-harness "twill weave" composition can prevent a large bias in the charged particles 33a and 33b and can improve flexibility in a specific direction owing to the texture of the weave. Further, thicker threadlike members may be used in the third embodiment than in the "plain weave" composition, enabling the production of a stiffer mesh-like body and improving the strength of the image-displaying device 1.

Figure 8:
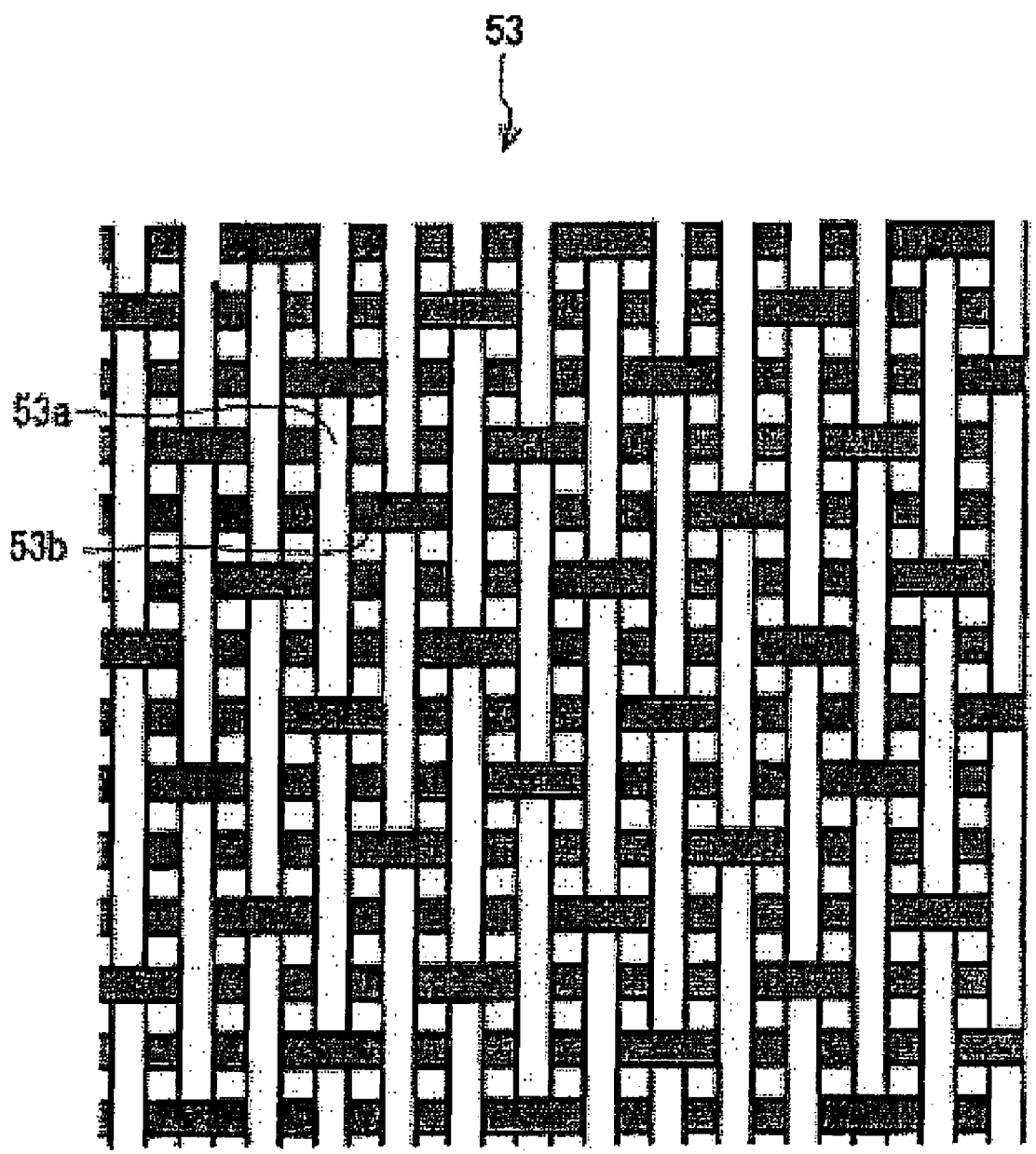
FIG. 8 is a front view of a mesh-like body 53 according to illustrative aspects of the invention.

Next, a fourth embodiment of the present invention will be described while referring to the accompanying drawings. FIG. 8 is a front view of a mesh-like body 53. As with the mesh-like body 50 according to the first embodiment, the mesh-like body 53 of the fourth embodiment is a member having a mesh structure configured by crossing a plurality of threadlike members 53a extending parallel to the lateral direction of the image-displaying device 1 (the left-to-right direction in FIG. 1) with a plurality of threadlike members 53b extending parallel to the longitudinal direction of the image-displaying device 1 (vertical direction in FIG. 1) to form a lattice shape. However, the mesh-like body 53 differs in the method of assembly. Here, the threadlike members 53a and 53b are identical to the threadlike members 50a and 50b in the first embodiment.

As shown in FIG. 8, the mesh-like body 53 of the preferred embodiment combines the threadlike members 53a and the threadlike members 53b, one of which are lengthwise threads and the other of which are crosswise threads, in equal units of five or more. Each thread in a given unit, intersects only one lengthwise or crosswise thread, producing a "satin weave" composition having regular points of intersection but no adjacent points of intersection More specifically, the mesh-like body 53 is produced by a five-harness satin, which is a "satin weave" composition comprising units of five lengthwise threads and crosswise threads each.

As in the first embodiment, when mounted inside the display section 30, the mesh-like body 53 evenly divides the interior of the display section 30 into a plurality of small cells. In other words, the mesh-like body is not limited to the "plain weave" composition of the first embodiment, but may have a "satin weave" composition or the like, as in the mesh-like body 53 of the present embodiment.

In the image-displaying device 1 according to the fourth embodiment described above, the mesh-like body 53 formed with a "satin weave" composition can prevent a large bias in the charged particles 33a and 33b and can improve flexibility in a specific direction owing to the texture of the weave. Further, thicker threadlike members may be used in the second embodiment than in the "plain weave" composition, enabling the production of a stiffer mesh-like body and improving the strength of the image-displaying device 1.

Figure 9:
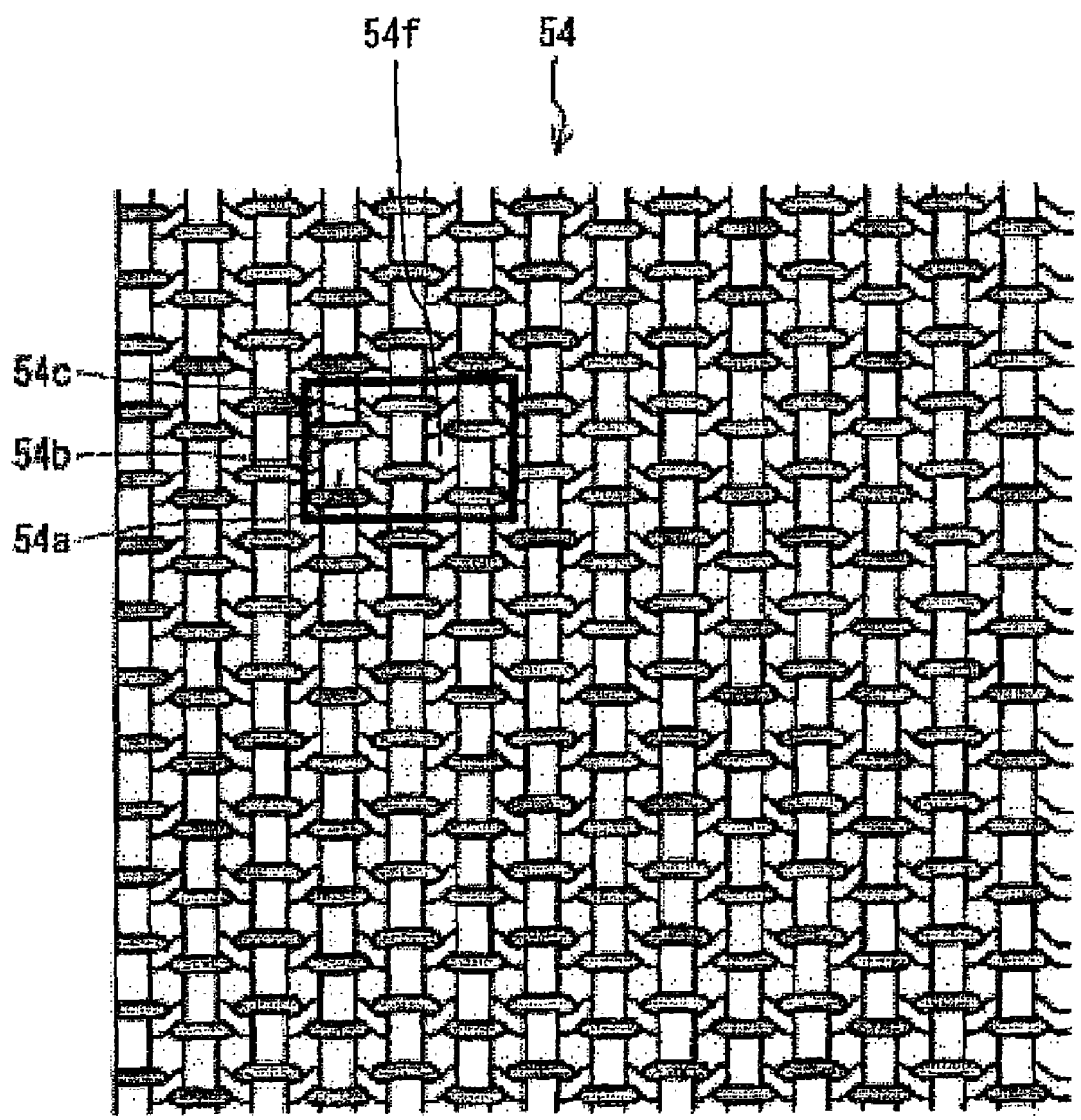
FIG. 9 is a front view of a mesh-like body 54 according to illustrative aspects of the invention.
Figure 10:
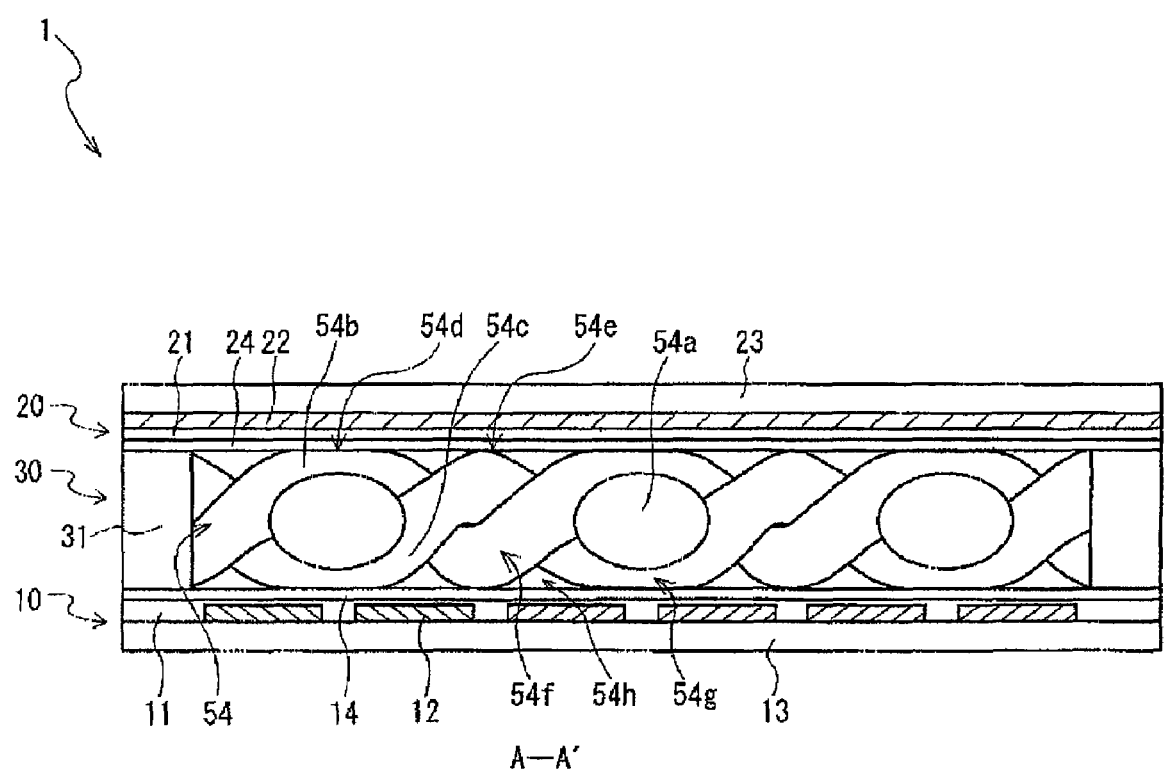
FIG. 10 is a cross-sectional view along a line A-A' (FIG. 1) in the direction of the arrow, showing an image-displaying device 1 according to a fifth embodiment according to illustrative aspects of the invention.

Next, a fifth embodiment of the present invention will be described while referring to the accompanying drawings. FIG. 9 is a front view of a mesh-like body 54. FIG. 10 is a cross-sectional view of the image-displaying device 1 according to the fifth embodiment along the line A-A' (FIG. 1). As with the mesh-like body 50 according to the first embodiment, the mesh-like body 54 of the preferred embodiment is a member having a mesh structure configured by crossing a plurality of threadlike members 54a extending parallel to the lateral direction of the image-displaying device 1 (the left-to-right direction in FIG. 1) with a plurality of threadlike members 54b and 54c extending parallel to the longitudinal direction of the image-displaying device 1 (vertical direction in FIG. 1) to form a lattice shape. However, the mesh-like body 54 differs in the method of assembly. Here, the threadlike members 54a are identical to the threadlike members 50a in the first embodiment. However, the threadlike members 54b and 54c have a substantially circular cross section and a smaller diameter than the threadlike members 50b in the first embodiment.

In the mesh-like body 54 according to the preferred embodiment shown in FIG. 9, pairs of the threadlike members 54b and 54c are interlaced and twisted together to form a single cord member. A plurality of these cord members are arranged parallel to each other in the longitudinal direction of the image-displaying device 1 (the vertical direction in FIG. 1). The mesh structure of the mesh-like body 54 is formed uniformly by combining a plurality of these cord members and a plurality of the threadlike members 54a at fixed intervals. For simplicity, the mesh-like body 54 of the preferred embodiment is configured by uniformly combining three threadlike members 54a and two cord members (threadlike members 54b and 54c; corresponding to the framed area in FIG. 9). Further, the threadlike members 54b are shown in color in FIG. 9 to distinguish them from the threadlike members 54c.

FIG. 10 shows a cross-section of three of the threadlike members 54a taken along the line A-A' (see FIG. 1) in the direction of the arrow. The threadlike members 54b and the threadlike members 54c extend between both ends of the display section 30 along the line A-A' so as to be symmetrical to each other about a horizontal plane passing through the axial center of the threadlike members 54a. The twisted threadlike members 54b and 54c form a single cord member. The threadlike members 54b and 54c follow an up and down undulating path inside the display section 30, forming a plurality of ring-shaped gaps 54d therebetween for gripping the threadlike members 54a. Further, the threadlike members 54b and 54c twist about each other at twisted parts 54e between neighboring threadlike members 54a where the threadlike members 54b and 54c intersect. More specifically, the threadlike members 54b pass over the threadlike members 54a, and the threadlike members 54c pass under the threadlike members 54a at the ring-shaped gaps 54d. The threadlike members 54b and 54c twist together at the twisted parts 54e, with the threadlike member 54b on the bottom and the threadlike member 54c on the top. The mesh-like body 54 is configured by alternating these ring-shaped gaps 54d and twisted parts 54e.

As in the first embodiment, when mounted inside the display section 30, the mesh-like body 54 evenly divides the interior of the display section 30 into a plurality of small cells. In other words, the mesh-like body is not limited to the "plain weave" composition of the first embodiment, but may be configured as the mesh-like body 54 according to the present embodiment, wherein cord members formed of a pair of the threadlike members 54b and 54c are alternately twisted between each threadlike member 54a.

As shown in FIG. 10 (the charged particles 33a and 33b are not shown), the mesh-like body 54 is constructed so that only the threadlike members 54b and 54c contact the bottom substrate 10 and the top substrate 20. However, since the threadlike members 54b and 54c have a smaller diameter (cross-sectional surface area) than the threadlike members 50a and 50b in the first embodiment, the mesh-like body 54 contacts the bottom substrate 10 and the top substrate 20 with less surface area, thereby increasing the aperture ratio.

In a plan view, small cells 54f are formed in the display section 30 provided with the mesh-like body 54. Continuous openings 54g are formed at each of the four sides of the small cells 54f as gaps between the threadlike members 54a and the bottom substrate 10 and top substrate 20. Further, continuous openings 54h are formed near the twisted parts 54e as gaps between the threadlike members 54b and 54c and the bottom substrate 10 and top substrate 20. The small cells 54f are interconnected via the continuous openings 54g and 54h. Since the continuous openings 54g and 54h have a smaller area than the continuous openings 50d in the first embodiment, the liquid dispersion medium 34 can flow into other small cells 54f, but the charged particles 33a and 33b cannot easily flow into other small cells 54f. Hence, it is unlikely that a large bias will be produced in the charged particles 33a and 33b.

The image-displaying device 1 according to the fifth embodiment described above can prevent a large bias in the charged particles 33a and 33b through the mesh-like body 54 formed of cord members having two threadlike members twisted together, thereby improving the image uniformity. The image-displaying device 1 can also increase the aperture ratio indicating the percentage of the display section 30 that is used for displaying an image, thereby improving contrast in the image.

Figure 11:
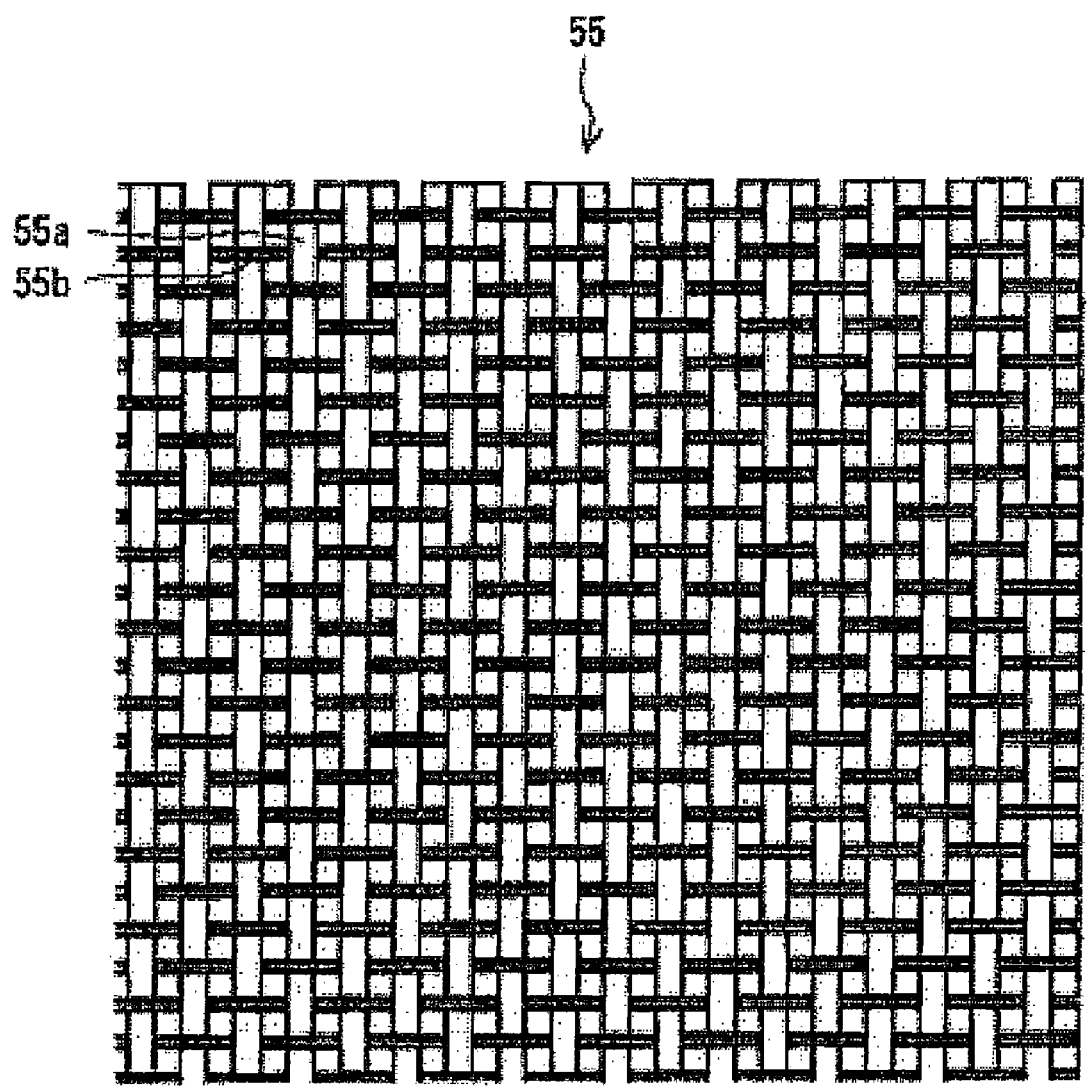
FIG. 11 is a front view of a mesh-like body 55 according to illustrative aspects of the invention.
Figure 12:
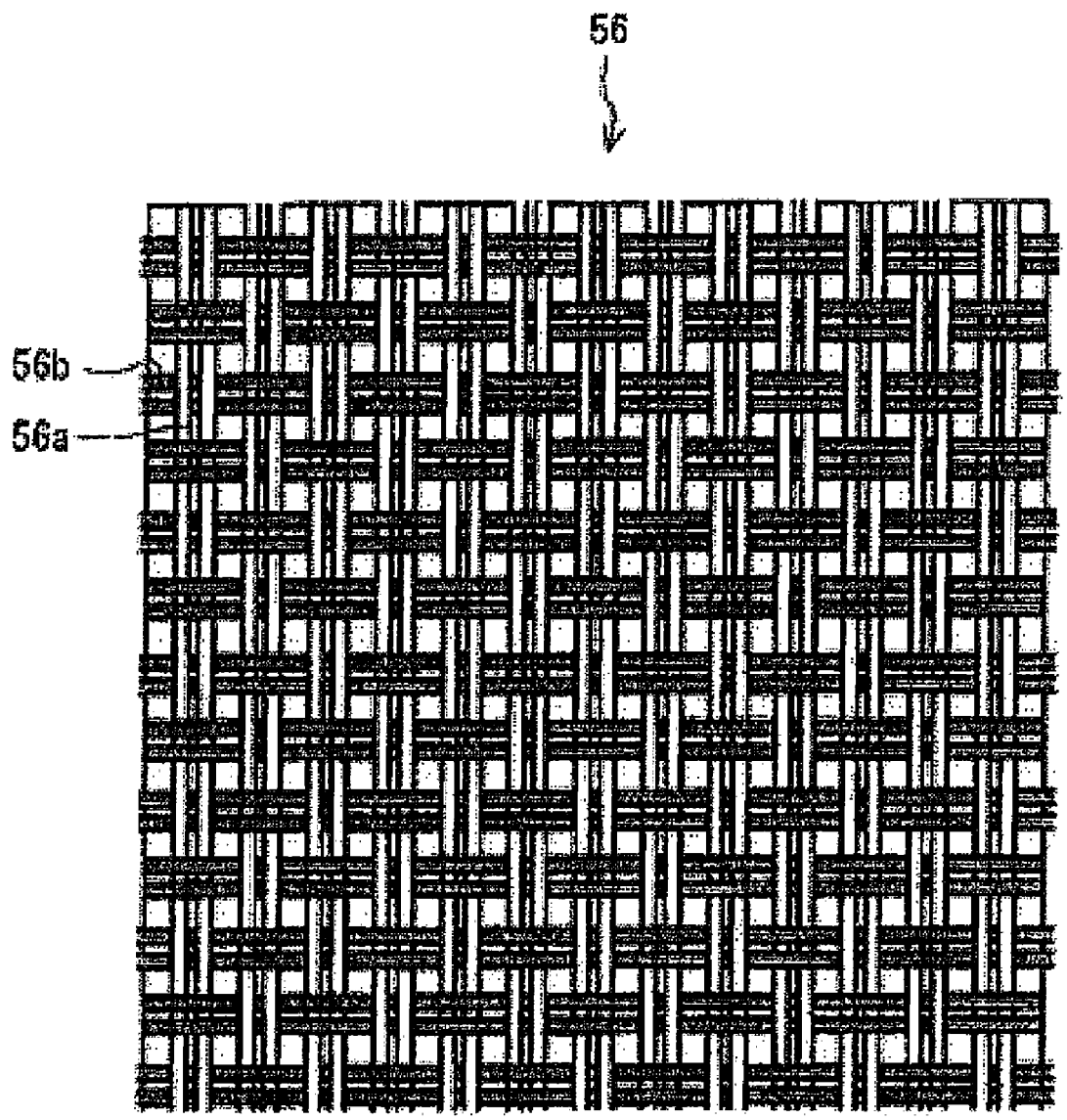
FIG. 12 is a front view of a mesh-like body 56 according to illustrative aspects of the invention.
Figure 13:
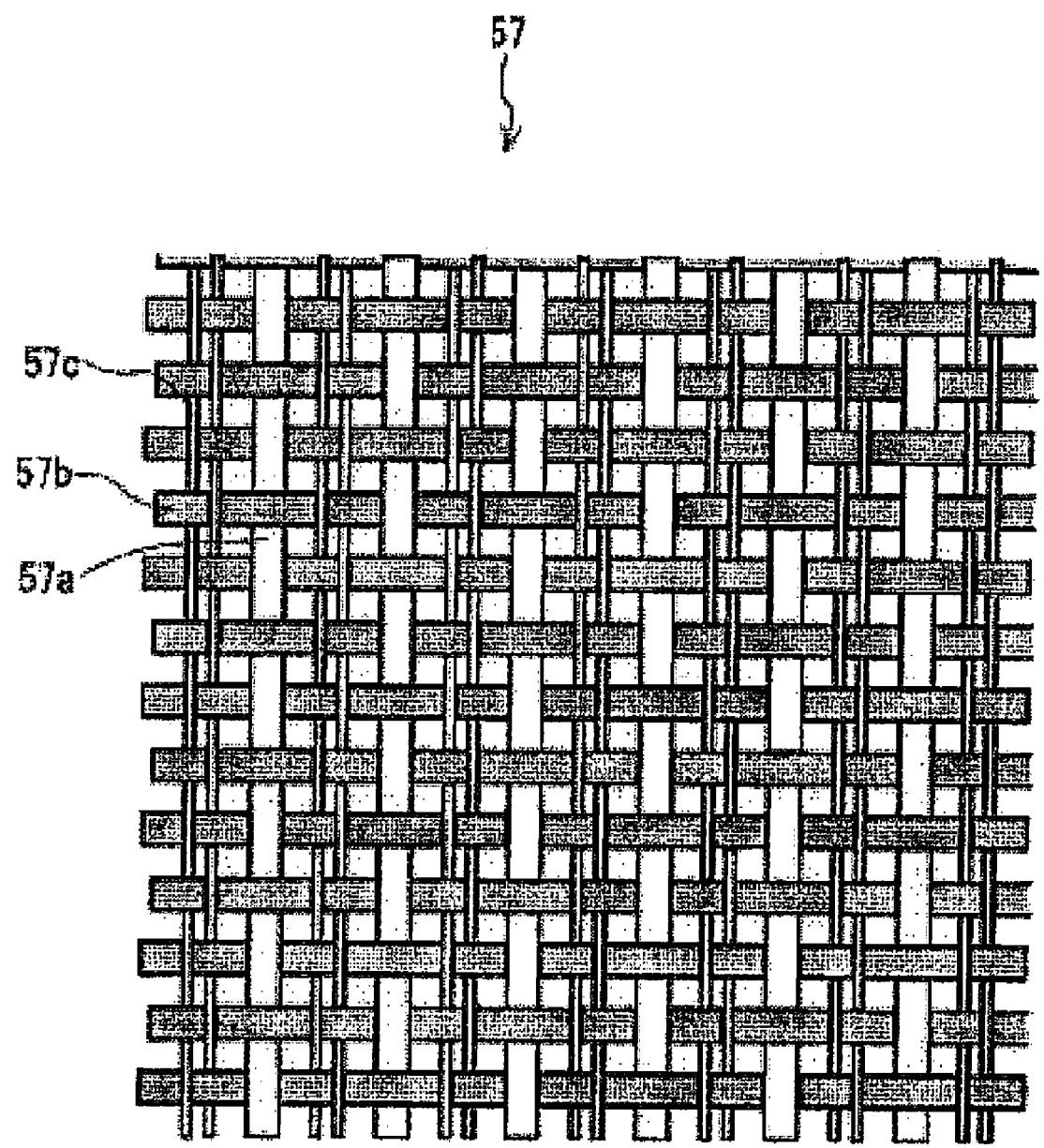
FIG. 13 is a front view of a mesh-like body 57 according to illustrative aspects of the invention.

Next, a sixth embodiment of the present invention will be described while referring to the accompanying drawings. FIG. 11 is a front view of a mesh-like body 55; FIG. 12 is a front view of a mesh-like body 56; and FIG. 13 is a front view of a mesh-like body 57. As with the mesh-like body 50 according to the first embodiment, the mesh-like bodies 55, 56, and 57 according to the preferred embodiment are members with a mesh structure configured of lengthwise threads and crosswise threads arranged in a "plain weave" composition. However, these mesh-like bodies are configured of differing threadlike members.

The mesh-like body 55 shown in FIG. 11 has threadlike members 55a that are identical to the threadlike members 50a in the first embodiment, and threadlike members 55b that have a smaller diameter than the threadlike members 50a. In this way, the mesh-like body 55 is configured of lengthwise threads (threadlike members 55a) and crosswise threads (threadlike members 55b) having different diameters.

The mesh-like body 56 shown in FIG. 12 has threadlike members 56a with a smaller diameter than the threadlike members 50a. A plurality of the threadlike members 56a is arranged parallel to each other in pairs with a large gap between pairs and a small gap between members of each pair. Similarly, the mesh-like body 56 includes threadlike members 56b having a smaller diameter than the threadlike members 50b. A plurality of the threadlike members 56b is arranged in pairs parallel to each other and orthogonal to the threadlike members 56a so that a large gap is formed between each pair and a smaller gap between members of each pair. By treating each pair of threadlike members 56a (and threadlike members 56b) as a unit, the mesh-like body 56 is formed with a "plain weave" composition by alternately passing each unit of lengthwise threads over and under each unit of crosswise threads at fixed intervals. It is also possible to configure the mesh-like body 56 by juxtaposing the threadlike members 56a (or threadlike members 56b) having the same diameter at differing intervals for at least one of the lengthwise threads and crosswise threads.

In the mesh-like body 57 shown in FIG. 13, threadlike members 57a and 57b are identical to the threadlike members 50a and 50b. However, a plurality of the threadlike members 57a and 57b are juxtaposed at a wider interval than the threadlike members 50a in the first embodiment, while two threadlike members 57c having a smaller diameter than the threadlike members 57a are arranged parallel to the threadlike members 57a and between neighboring threadlike members 57a. The gap between the pair of threadlike members 57c is smaller than the gap between each threadlike member 57c and the neighboring threadlike member 57a. In this way, it is possible to configure the mesh-like body 57 with two threadlike members 57c having a smaller diameter than the threadlike members 57a disposed between adjacent threadlike members 57a for at least one of the lengthwise threads and the crosswise threads.

As in the first embodiment described above, by mounting the mesh-like bodies 55, 56, or 57 in the display section 30, the mesh structure of the mesh-like bodies 55, 56, and 57 can evenly divide the interior of the display section 30 into a plurality of small cells. In other words, while the mesh-like body 50 having a "plain weave" composition with evenly arranged threadlike members 50a and 50b is formed in the first embodiment, it is also possible to use the mesh-like bodies 55, 56, and 57 using the same method of assembly (weaving method), but having differing intervals formed between threadlike members, varying diameters of threadlike members, and differing orders of arrangement.

With the image-displaying device 1 according to the sixth embodiment, the mesh-like bodies 55, 56, and 57 having similar "plain weave" compositions can prevent a large bias in the charged particles 33a and 33b. Since this structure can increase the aperture ratio indicating the percentage of the display section 30 used for displaying an image, it is possible to improve image contrast. Further, since this structure allows the use of thinner mesh-like bodies 55, 56, and 57 without a loss in mechanical strength, it is possible to reduce the distance between the two substrates, effectively enabling the charged particles 33a and 33b to be moved with less power consumption. Further, by forming the threadlike members 56a and threadlike members 56b in pairs, it is possible to maintain the small cells if one of the threadlike members 56a or one of the threadlike members 56b is broken, for example.

Figure 14:
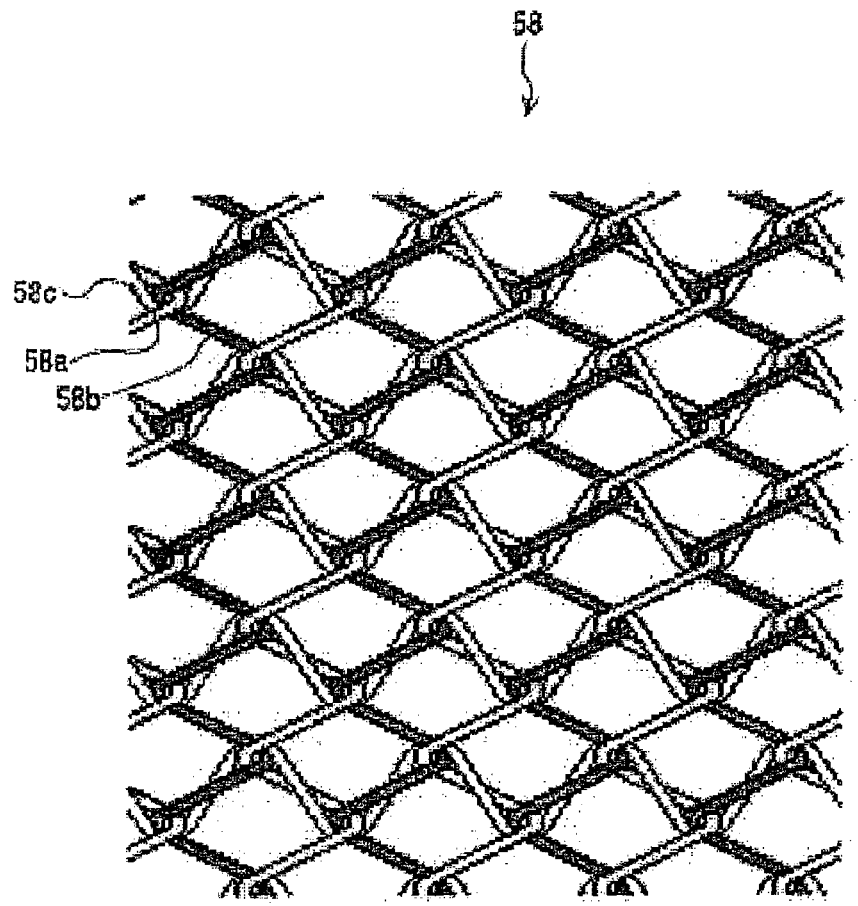
FIG. 14 is a front view of a mesh-like body 58 according to illustrative aspects of the invention.

Next, a seventh embodiment according to the present invention will be described while referring to the accompanying drawings. FIG. 14 is a front view of a mesh-like body 58. As with the mesh-like body 50 according to the first embodiment, the mesh-like body 58 according to the present embodiment is a member having a mesh structure that is configured of lengthwise threads and crosswise threads. However, the method of assembly is different.

As shown in FIG. 14, the mesh-like body 58 is a member having a mesh structure formed uniformly with diamond shapes by weaving a plurality of threadlike members 58a and 58b extending parallel to the lateral direction of the image-displaying device 1 (left-to-right direction in FIG. 1) with a plurality of threadlike members 58c extending in the longitudinal direction (vertical direction in FIG. 1) so that each of the threadlike members 58a, 58b, and 58c intersect at the same positions. The threadlike members 58a, 58b, and 58c contact the top substrate 20 and bottom substrate 10 at these points of intersection.

As in the first embodiment described above, by providing the mesh-like body 58 inside the display section 30, the mesh structure of the mesh-like body 58 can evenly divide the interior of the display section 30 into a plurality of small cells. In other words, while the mesh-like body 50 according to the first embodiment is formed in a lattice-shaped mesh structure, the present invention may be applied to a mesh-like body having various configurations, such as the mesh-like body 58 of the present embodiment formed in a diamond-shaped mesh structure.

With the image-displaying device 1 according to the seventh embodiment described above, the mesh-like body 58 formed in the diamond-shaped mesh structure can prevent a large bias in the charged particles 33a and 33b. This structure can also increase the aperture ratio specifying the amount of the display section 30 used for displaying an image, thereby improving the contrast of the image.

Figure 15:
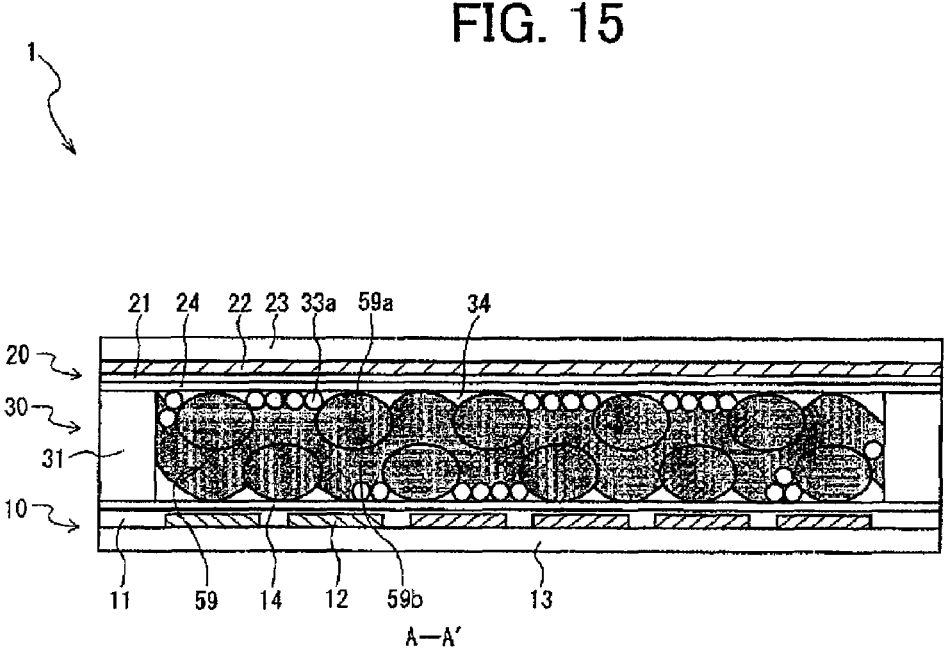
FIG. 15 is a cross-sectional view along the line A-A' (FIG. 1) in the direction of the arrow, showing an image-displaying device 1 according to an eighth embodiment according to illustrative aspects of the invention.
Figure 16:
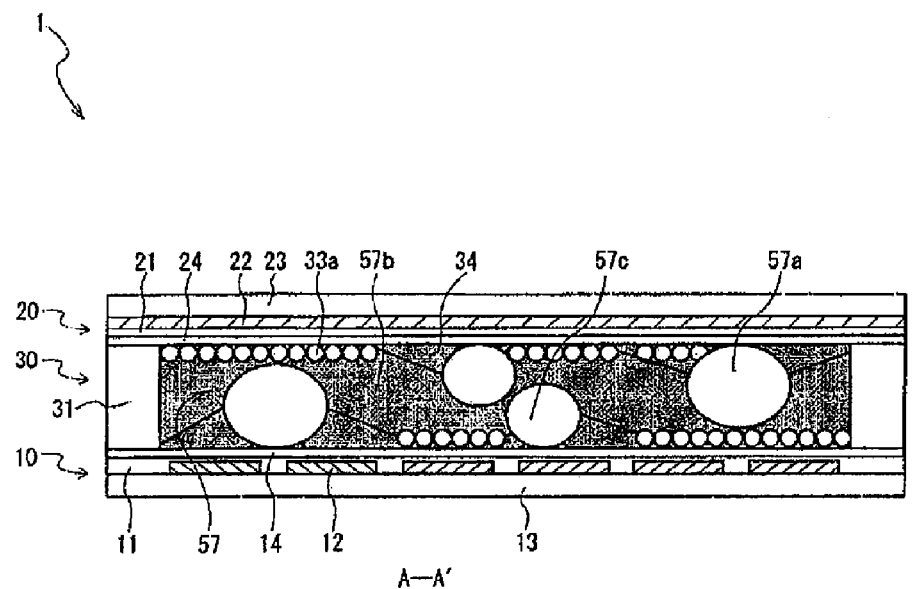
FIG. 16 is a cross-sectional view along the line A-A' (FIG. 1) in the direction of the arrow, showing an image-displaying device 1 according to the eighth embodiment according to illustrative aspects of the invention.

Next, an eighth embodiment of the present invention will be described while referring to the accompanying drawings. FIGS. 15 and 16 are cross-sectional views of the image-displaying device 1 according to the eighth embodiment along the line A-A' (FIG. 1). The image-displaying device 1 according to the preferred embodiment differs from that in the first embodiment in the structure related to displaying images.

As in the first embodiment described above, the image-displaying device 1 shown in FIG. 15 is provided with a mesh-like body 59 configured of threadlike members 59a and 59b assembled in a "plain weave" composition. However, the width between neighboring threadlike members in the mesh-like body 59 is narrower than in the mesh-like body 50 according to the first embodiment. In a plan view, there are no gaps in the mesh-like body 59 through which the bottom substrate 10 can be seen when the user views the display section 30 via the top substrate 20 from above. In addition, the display section 30 is not provided with charged particles 33b. Accordingly, the color tone of the mesh-like body 59 is visible in areas where the charged particles 33a are not present. Hence, the mesh-like body 59 is given a black color tone in the preferred embodiment to replace the charged particles 33b. Using an electric field to control the movement of the charged particles 33a, which are white in color, it is possible to control the display of white and black for each dot.

In the image-displaying device 1 shown in FIG. 16, the mesh-like body 57 of the sixth embodiment (see FIG. 13) is provided inside the display section 30. In a plan view, the color tone of the liquid dispersion medium 34 is visible in areas that the charged particles 33a are not present when the user views the display section 30 via the top substrate 20 from above. Hence, the charged particles 33b are not provided in the preferred embodiment, and the liquid dispersion medium 34 is given a black color tone. Accordingly, movement of the charged particles 33a, which are white in color, is controlled by generating an electric field in the display section 30 in order to display white or black for each dot.

In this way, it is possible to employ various methods of displaying images not limited to the method of using two types of particles 33a and 33b described in the first embodiment. The present embodiment gives one example of displaying images with one type of particles 33a.

With the image-displaying device 1 according to the eighth embodiment described above, it is possible to display images using the single type of charged particles 33a, while preventing a large bias in the charged particles 33a. Further, since this structure reduces the amount of charged particles used in the image-displaying device 1, the image-displaying device 1 can be manufactured at a lower cost.

While the invention has been described in detail with reference to the above aspects thereof, it would be apparent to those skilled in the art that various changes and modifications may be made therein without departing from the spirit of the invention.

Figure 17:
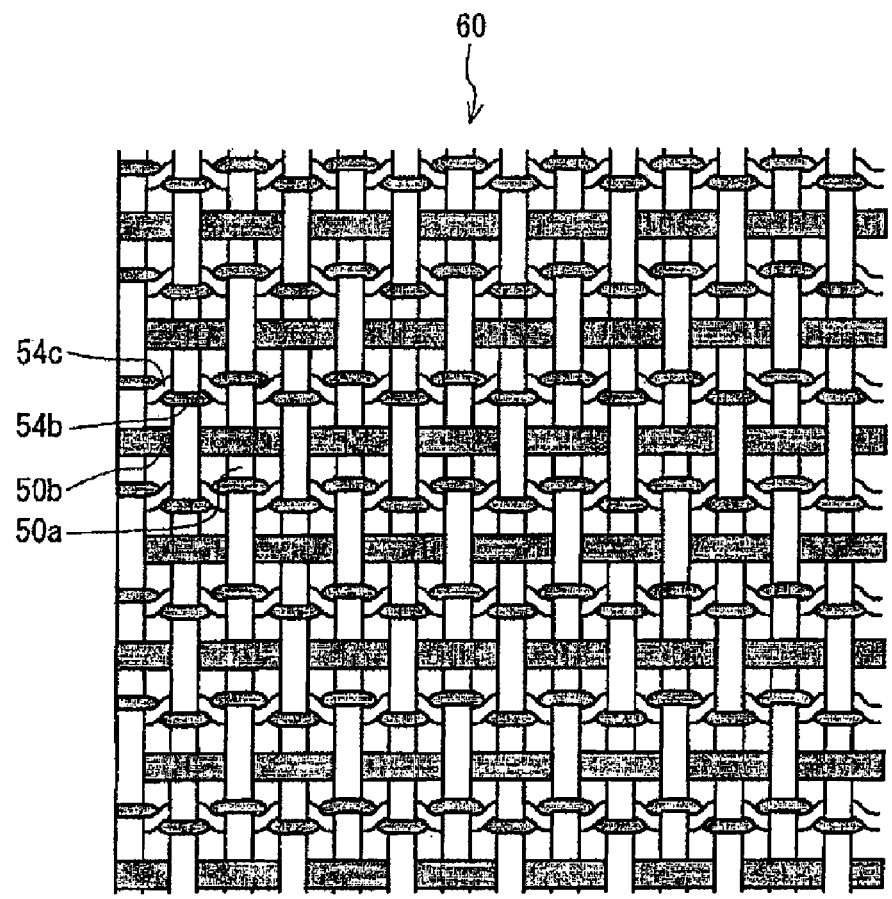
FIG. 17 is a front view of a mesh-like body 60 according to illustrative aspects of the invention.

The present invention may also be implemented by combining the image-displaying devices 1 described in the first through eighth embodiments. For example, FIG. 17 shows a front view of a mesh-like body 60 that may be formed uniformly by providing cord members formed of pairs of the threadlike members 54b and 54c (see FIG. 9) described in the fourth embodiment between neighboring threadlike members 50b formed in the mesh-like body 50 (see FIG. 4) described in the first embodiment.

Figure 18:
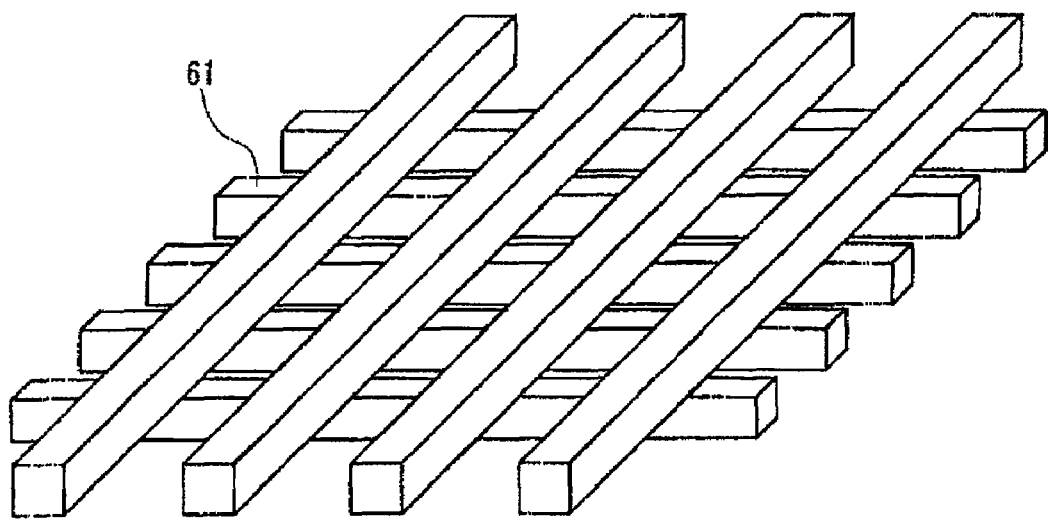
FIG. 18 is a perspective view of a mesh-like body 61 according to illustrative aspects of the invention.

Further, FIG. 18 is a perspective view of a mesh-like body 61 in which lengthwise threads and crosswise threads having square cross sections are arranged in their own plane. In other words, the lengthwise threads and crosswise threads intersect each other at prescribed intervals, without moving up and down.

Further, while a single layer of the mesh-like body 50 is provided inside the display section 30 in the preferred embodiments, it is possible to stack a plurality of layers of mesh-like bodies 50 therein. It is also possible to provide different types of mesh-like bodies (such as the mesh-like bodies 50 and 51) in a single layer within the display section 30, without overlapping the mesh-like bodies and without a gap therebetween, or to provide the different types stacked in a plurality of layers. Hence, the mesh-like body 50 may be provided in any formation desired by the designer or user.

Further, the mesh-like body 50 may be formed uniformly as a woven fabric configured of a plurality of independent threadlike members 50a and 50b woven together, or may processed uniformly by pressing metal, for example. Further, while various organic polymer compounds were used for the threadlike members 50a and 50b in the preferred embodiments, these threadlike members may be configured of natural fibers, as well. In this case, the charged particles 33a and 33b are more likely to become deposited on the fiber since the surface of the threadlike members will have micro-folds formed therein, thereby more reliably preventing the charged particles 33a and 33b from migrating to other small cells 50c.

Further, the mesh described in the preferred embodiments need not be woven. For example, the mesh may be configured of a single threadlike member extending in one direction and a single threadlike member intersecting the first threadlike member. In this case, the two threadlike members divide the display section 30 into four partitioned areas.

Further, while the mesh-like body 50 described above is fixed inside the display section 30 by the bottom adhesive layer 14 and top adhesive layer 24, but the mesh-like body 50 need only be fixed to one of the bottom adhesive layer 14 and the top adhesive layer 24. In this case, it is preferable that the mesh-like body 50 be fixed to the top substrate 20 via the top adhesive layer 24. When fixing the mesh-like body 50 to the top substrate 20 side, charged particles 33a and 33b that have migrated to the top substrate 20 side are less likely to shift, thereby increasing the stability of the displayed image.

Figure 19:
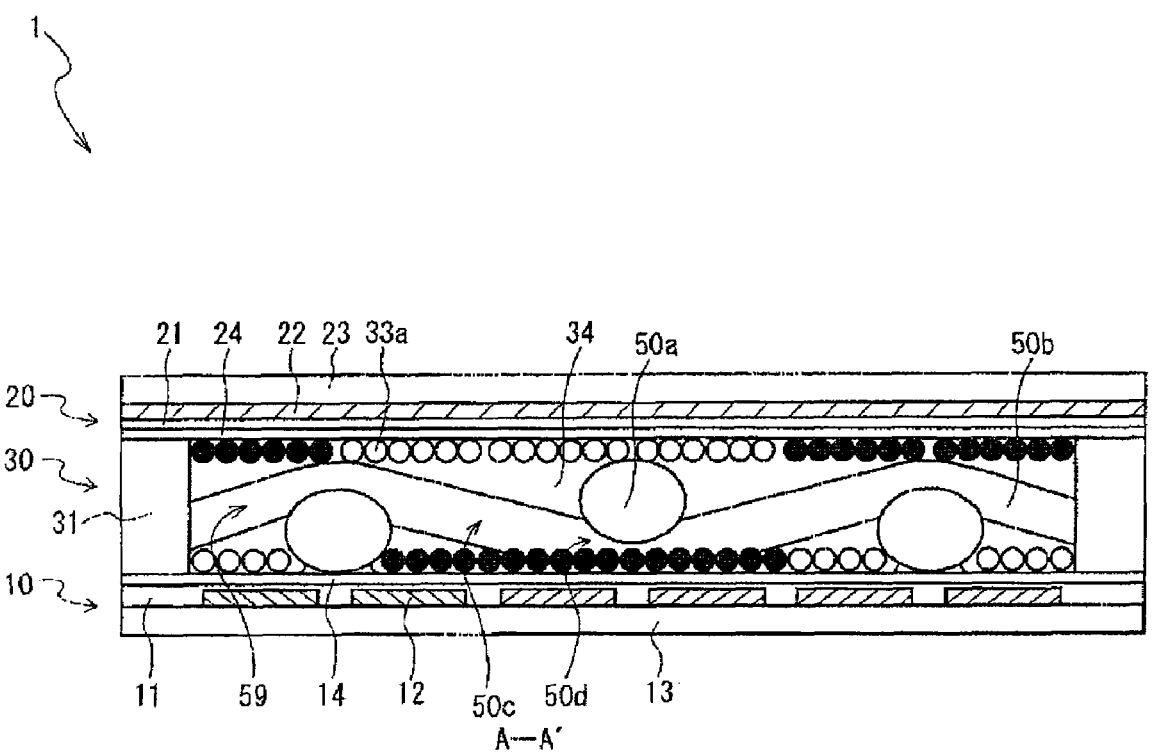
FIG. 19 is a cross-sectional view along the line A-A' (FIG. 1) in the direction of the arrow, showing the image-displaying device 1 when the mesh-like body is not in contact with the pair of substrates according to illustrative aspects of the invention.

FIG. 19 is a cross-sectional view of the image-displaying device 1 along the line A-A' (see FIG. 1) in which the mesh-like body 50 is fixed to the bottom adhesive layer 14 on the bottom substrate 10 side and does not contact the top substrate 20. With this construction, a gap through which the charged particles 33a and 33b can migrate is formed between the bottom surface of the top substrate 20 and the mesh-like body 50, enabling the entire region of the top substrate 20 to be used as a display surface. However, since the mesh-like body 50 no longer functions as a spacer for maintaining a fixed distance between the bottom substrate 10 and the top substrate 20, it is necessary to use the sealing layer 31 as a spacer or to provide another member in the display section 30 to function as a spacer.

Further, while monochromatic image display using the colors white and black is described in the eighth embodiment, it is also possible to perform color image display using a plurality of charged particles Further, it should be apparent that the mesh-like body 50, the charged particles 33a and 33b, and the liquid dispersion medium 34 are not limited to the color tones indicated in the preferred embodiments described above but can be any color, tones that the user or designer wishes to use according to the intended use or application.

The image-displaying device 1 of the preferred embodiment described above may also be configured without the bottom electrodes 12 and top electrodes 22. In this case, images are displayed by applying an electric field to the image-displaying device 1 with an external device capable of generating an electric field. Since this construction can be made thinner by an amount equivalent to the bottom electrodes 12 and top electrodes 22, the image-displaying device 1 has the advantage of easier portability.

Further, the image-displaying device 1 of the preferred embodiments applies a simple matrix drive system using the bottom electrodes 12 and top electrodes 22. However, it is also possible to employ a segment drive system or the passive matrix drive system, represented by the system used in TFT monitors.

Further, the numeral "0" was displayed with the image-displaying device 1 (see FIG. 1) as an example in the preferred embodiments. However, it should be apparent that the image-displaying device 1 can also display another desired image, including various characters and patterns, and may display a plurality of images rather than just one. Further, the threadlike members may be formed entirely of an insulating material, or may be formed of a conducting material coated with an insulating material.

What is claimed is:

1. An electrophoretic display comprising:
a first substrate;
a second substrate disposed in opposition to the first substrate;
a mesh-like body interposed between the first substrate and the second substrate, wherein at least a surface of the mesh-like body is formed of an insulating material, and the mesh-like body comprises:
a plurality of lengthwise members; and
a plurality of crosswise members which intersect the plurality of lengthwise members at predetermined intervals, wherein the plurality of lengthwise members and the plurality of crosswise members comprise threadlike members extending in one direction and threadlike members extending in another direction, respectively, wherein the threadlike members extending in the one direction have a different diameter from the threadlike members extending in the another direction; and
charged particles dispersed in a space formed by a surface of the first substrate opposing the second substrate, a surface of the second substrate opposing the first substrate, and the surface of the mesh-like body, the charged particles moving within the space in response to an electric field generated between the first substrate and the second substrate.

2. The electrophoretic display according to claim 1, wherein the threadlike members extending in the one direction are woven with the threadlike members extending in the another direction each time the threadlike members extending in the one direction intersect a prescribed number of the threadlike members extending in the another direction.

3. The electrophoretic display according to claim 1, wherein a unit including a plurality of the threadlike members extending in the one direction intersects the threadlike members extending in the another direction.

4. The electrophoretic display according to claim 3, wherein the unit of threadlike members passes between adjacent threadlike members extending in the another direction.

5. The electrophoretic display according to claim 1, wherein the plurality of threadlike members extending in the one direction and the plurality of threadlike members extending in the another direction are repeatedly arranged in a prescribed order.

6. The electrophoretic display according to claim 1, wherein the mesh-like body is formed uniformly by intertwining the threadlike members extending in the one direction with the threadlike members extending in the other direction.

7. The electrophoretic display according to claim 1, wherein the mesh-like body is formed uniformly by weaving the threadlike members extending in the one direction with the threadlike members extending in the other direction.

8. The electrophoretic display according to claim 1, wherein the mesh-like body is disposed between the first substrate and the second substrate so that a plane of the mesh shape is parallel to the first substrate and the second substrate.

9. The electrophoretic display according to claim 1, wherein the threadlike members are formed of an organic polymer compound.

10. The electrophoretic display according to claim 1, wherein the mesh-like body is bonded to at least one of the surface of the first substrate opposing the second substrate and the surface of the second substrate opposing the first substrate.

11. The electrophoretic display according to claim 1, wherein at least one of the first substrate and the second substrate is a translucent substrate disposed on a display surface side; and the mesh-like body is bonded to the substrate disposed on the display surface side.

12. The electrophoretic display according to claim 1, wherein the first and second substrates and the mesh-like body have flexibility.

13. The electrophoretic display according to claim 1, wherein the first substrate has first electrodes and the second substrate has second electrodes; and the first electrodes and the second electrodes generate an electric field between the first and second substrates.

14. The electrophoretic display according to claim 13, wherein the first electrodes are line electrodes parallel to the first substrate, and the second electrodes are line electrodes that are oriented parallel to the second substrate and orthogonal to the first electrodes.

15. The electrophoretic display according to claim 13, wherein one of the first electrodes and the second electrodes is a single electrode to which a fixed potential is applied, and the other of the first electrodes and the second electrodes is configured of a plurality of electrodes to which voltages are applied individually.

16. The electrophoretic display according to claim 1, wherein the charged particles comprise at least two types of charged particles having different color tones respectively.

17. The electrophoretic display according to claim 1, wherein the charged particles comprise at least two types of charged particles having differing color tones respectively; and color tone of the threadlike members is identical to the color tone of one type of the charged particles.

18. The electrophoretic display according to claim 1, wherein the mesh-like body is a spacer for maintaining a fixed distance between the first substrate and the second substrate.

* * * * *